(12) United States Patent  
Hattori

(10) Patent No.: US 9,301,131 B2  
(45) Date of Patent: Mar. 29, 2016

(54) INFORMATION PROCESSING SYSTEM, INFORMATION PROCESSING DEVICE, COMPUTER READABLE STORAGE MEDIUM STORING INFORMATION PROCESSING PROGRAM, AND INFORMATION PROCESSING METHOD

(71) Applicant: NINTENDO CO., LTD., Kyoto (JP)

(72) Inventor: Yurie Hattori, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 186 days.

(21) Appl. No.: 13/713,906

(22) Filed: Dec. 13, 2012

(65) Prior Publication Data

US 2013/0173755 A1  Jul. 4, 2013

(30) Foreign Application Priority Data

Dec. 28, 2011 (JP) ................................ 2011-287577

(51) Int. Cl.
```
G06F 15/177    (2006.01)
H04W 8/24      (2009.01)
H04W 4/00      (2009.01)
H04W 4/02      (2009.01)
```
(52) U.S. Cl.  
CPC ............. *H04W 8/245* (2013.01); *H04W 4/008* (2013.01); *H04W 4/02* (2013.01); *H04W 4/021* (2013.01)

(58) Field of Classification Search  
USPC ......................................... 709/203, 222, 219  
See application file for complete search history.

(56) References Cited

U.S. PATENT DOCUMENTS

| | | | |
|---|---|---|---|
| 2004/0259642 A1 | 12/2004 | Tanaka et al. | |
| 2006/0234631 A1* | 10/2006 | Dieguez | 455/41.2 |
| 2010/0138481 A1* | 6/2010 | Behrens | 709/203 |
| 2012/0036181 A1* | 2/2012 | Isidore | 709/203 |
| 2012/0079086 A1* | 3/2012 | Miettinen | 709/222 |

FOREIGN PATENT DOCUMENTS

| | | |
|---|---|---|
| EP | 1493474 | 1/2005 |
| JP | 2005-028103 | 2/2005 |
| JP | 2010-066788 | 3/2010 |
| JP | 2010-157172 | 7/2010 |

OTHER PUBLICATIONS

European Patent Office, "Communication with Partial European Search Report," (6 pages), issued in connection with European Patent Application No. 12196432.4, dated Jun. 15, 2015.  
Office Action issued in U.S. Appl. No. 14/813,318 dated Jan. 20, 2016.

* cited by examiner

*Primary Examiner* — Natisha Cox  
(74) *Attorney, Agent, or Firm* — Nixon & Vanderhye P.C.

(57) ABSTRACT

Web pages corresponding to example game devices are previously provided in a server. One of the game devices obtains a character from another one of the game devices when these game devices pass each other. The one of the game devices processes the obtained character and transmits the processed character to the web page corresponding to the other game device in the server, and the character is stored in the server. The other game device accesses the web page corresponding to the other game device in the server to obtain the processed character.

16 Claims, 24 Drawing Sheets

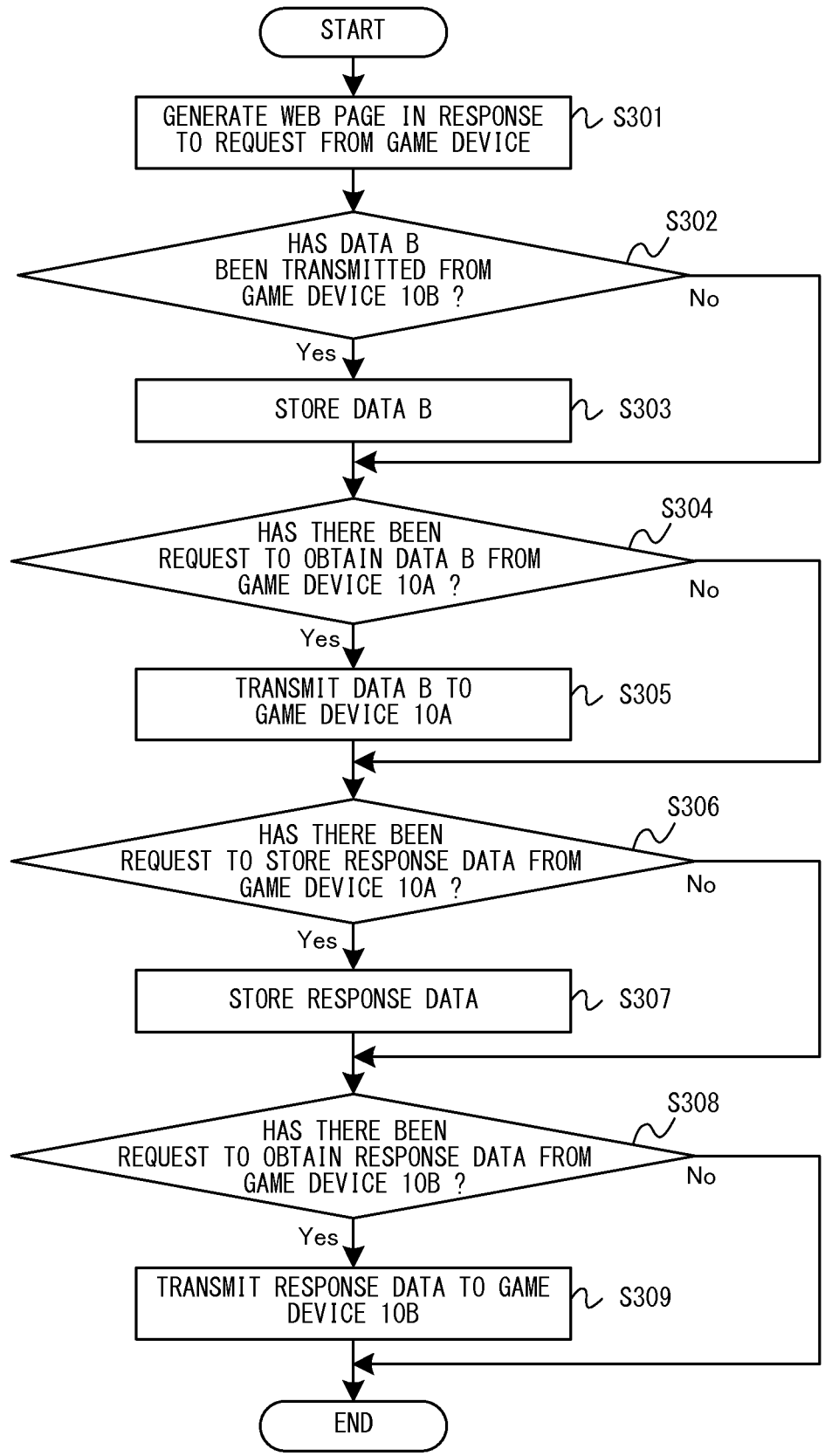

F I G. 1 4

| STORAGE DESTINATION | DATA | TRANSMISSION SOURCE |
|---|---|---|
| COLLECTION DATA BOX 65A OF WEB PAGE A (IDENTIFICATION INFORMATION A) | DATA B | GAME DEVICE 10B (IDENTIFICATION INFORMATION B) |
| | DATA C | GAME DEVICE 10C (IDENTIFICATION INFORMATION C) |
| | . . . | . . . |
| COLLECTION DATA BOX 65X OF WEB PAGE X (IDENTIFICATION INFORMATION X) . . . | . . . | . . . |

F I G. 1 8
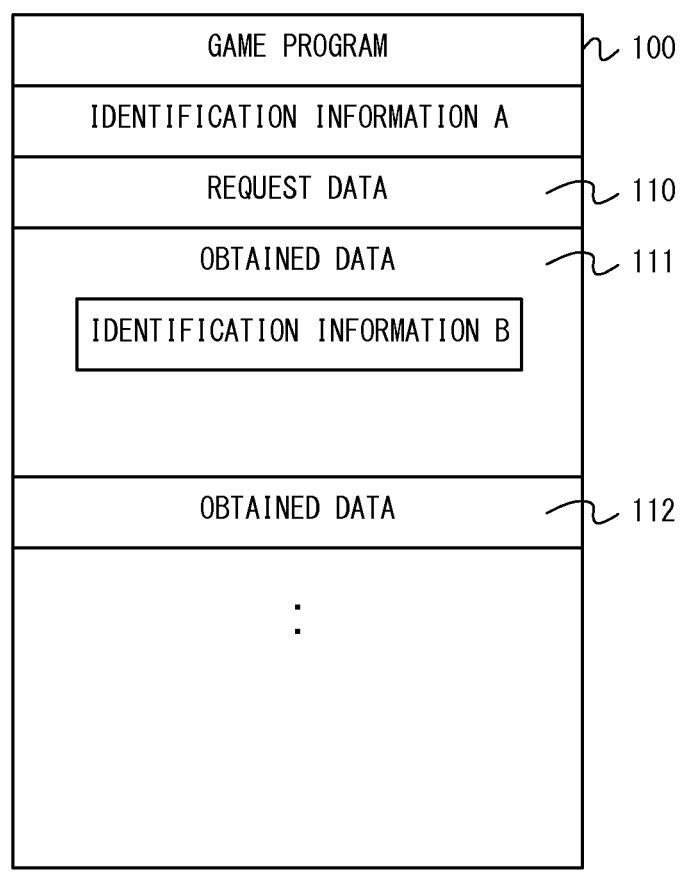

INFORMATION PROCESSING SYSTEM, INFORMATION PROCESSING DEVICE, COMPUTER READABLE STORAGE MEDIUM STORING INFORMATION PROCESSING PROGRAM, AND INFORMATION PROCESSING METHOD

CROSS REFERENCE TO RELATED APPLICATION

The disclosure of Japanese Patent Application No. 2011-287577, filed Dec. 28, 2011, is incorporated herein by reference.

FIELD

The technology herein relates to information processing systems including a plurality of information processing devices having a wireless communication function, the information processing devices, information processing programs, and information processing methods.

BACKGROUND AND SUMMARY

Conventionally, there are terminals and devices etc. which exchange data, via wireless communication, with unspecified other terminals which are located within the wireless communication range. For example, conventionally, one game device transmits and receives to and from another game device located within the wireless communication range, exchange conditions under which one game device exchange data with another game device, after wireless communication has been established therebetween, and exchanges game data if the exchange conditions coincide each other.

However, conventionally, devices only exchange data when the devices are located within the wireless communication range, and after the data exchange, the users of the devices do not communicate with each other if the devices are separated from each other by a distance exceeding the wireless communication range.

Therefore, it is an object of an example embodiment to provide an information processing system, information processing device, information processing program, and information processing method which allow a user to communicate with an unspecified other user after their devices have exchanged data when the devices were located within a predetermined range from each other.

To achieve the object, example embodiments have configurations as follows.

An example embodiment is an information processing system including a plurality of information processing devices having a wireless communication function, and a server. One of the information processing devices includes a first identification information obtaining unit and a client transmission unit. The first identification information obtaining unit is configured to obtain, via wireless communication, first identification information possessed by an unspecified other one of the information processing devices located within a predetermined range from the one of the information processing devices. The client transmission unit is configured to transmit transmission data stored or generated by the one of the information processing devices to the server on a network using the first identification information. The server includes an accumulation unit and a server transmission unit. The accumulation unit is configured to accumulate the transmission data transmitted by the client transmission unit. The server transmission unit is configured to transmit the transmission data accumulated in the accumulation unit to the unspecified other one of the information processing devices in response to access performed by the unspecified other one of the information processing devices. The unspecified other one of the information processing devices includes a transmission data obtaining unit configured to access the server using the first identification information to obtain the transmission data accumulated in the server.

With this configuration, when the one of the information processing devices and the unspecified other one of the information processing devices are located within the predetermined range from each other, the one of the information processing devices obtains the first identification information possessed by the unspecified other one of the information processing devices. The one of the information processing devices transmits the transmission data to the server using the first identification information. The server accumulates the transmission data, and transmits the transmission data to the unspecified other one of the information processing devices in response to access from the unspecified other one of the information processing devices. The unspecified other one of the information processing devices accesses the server to obtain the transmission data from the one of the information processing device. As a result, for example, the user of the one of the information processing devices can transmit data to the user of the unspecified other one of the information processing devices after the users have passed each other, and thereafter, the users can communicate with each other on the server.

In another configuration of the above example embodiment, the server may have information related to the unspecified other one of the information processing devices, where the information may be published for at least the one of the information processing devices which has obtained the first identification information, and the unspecified other one of the information processing devices. The one of the information processing devices which has obtained the first identification information may be allowed to browse the information related to the unspecified other one of the information processing devices using the first identification information.

With this configuration, the user of the one of the information processing devices can browse the information related to the unspecified other one of the information processing devices by accessing the server using the obtained first identification information. As a result, when the user of the one of the information processing devices transmits transmission data to the user of the unspecified other one of the information processing devices who that user has passed, using the browsed information. Also, the user of the one of the information processing devices may be prompted or induced to browse information related to the user of the unspecified other one of the information processing devices who that user has passed.

In another configuration of the above example embodiment, the information related to the unspecified other one of the information processing devices may be published for a third one of the information processing devices which has not obtained the first identification information, and the third one of the information processing devices is allowed to browse the information related to the unspecified other one of the information processing devices by accessing the server.

With this configuration, the information related to the unspecified other one of the information processing devices is published for a third one of the information processing devices which has not obtained the first identification information from the unspecified other one of the information processing devices. As a result, the third one of the information processing devices can be used to browse the information related to the unspecified other one of the information processing devices.

In another configuration of the above example embodiment, the information related to the unspecified other one of the information processing devices may include information transmitted from the unspecified other one of the information processing devices.

With this configuration, the one of the information processing devices can be used to browse the information transmitted from the unspecified other one of the information processing devices. Based on the information, the user of the one of the information processing devices can transmit transmission data to the user of the unspecified other one of the information processing devices.

In another configuration of the above example embodiment, the information related to the unspecified other one of the information processing devices may include information generated by a user of the unspecified other one of the information processing devices.

With this configuration, the user of the one of the information processing devices can transmit transmission data to the user of the unspecified other one of the information processing devices based on information generated by the user of the unspecified other one of the information processing devices.

In another configuration of the above example embodiment, the server may have an information publishing area corresponding to the unspecified other one of the information processing devices. The information publishing area corresponding to the unspecified other one of the information processing devices may include the information related to the unspecified other one of the information processing devices.

With this configuration, the server has the information publishing area corresponding to the unspecified other one of the information processing devices. The information publishing area can contain the information related to the unspecified other one of the information processing devices.

In another configuration of the above example embodiment, the accumulation unit may accumulate the transmission data in the information publishing area corresponding to the unspecified other one of the information processing devices.

With this configuration, transmission data from the one of the information processing devices is accumulated in the information publishing area corresponding to the unspecified other one of the information processing devices. As a result, the one of the information processing devices can obtain various pieces of accumulated transmission data by accessing the information publishing area.

In another configuration of the above example embodiment, the information publishing area corresponding to the unspecified other one of the information processing devices may include a private portion on which a predetermined access limitation is provided. The accumulation unit may accumulate the transmission data in the private portion of the information publishing area corresponding to the unspecified other one of the information processing devices.

With this configuration, the transmission data is accumulated in the private portion on which the predetermined access limitation is provided. Therefore, for example, access from the third party which is different from the user of the unspecified other one of the information processing devices who the user of the one of the information processing devices has passed can be limited, and therefore, the user of the one of the information processing devices can more easily communicate with the user of the unspecified other one of the information processing devices who the user of the one of the information processing devices has passed.

In another configuration of the above example embodiment, the unspecified other one of the information processing devices may include a response data transmission unit. The response data transmission unit may be configured to transmit, to the server, response data indicating a response to the transmission data obtained by the transmission data obtaining unit. The server may include a response data accumulation unit configured to accumulate the response data. The one of the information processing devices may include a response data obtaining unit configured to obtain the response data accumulated in the server.

With this configuration, the user of the unspecified other one of the information processing devices who has obtained the transmission data can transmit response data to the user of the one of the information processing devices who has transmitted the transmission data. As a result, the users who have passed each other can perform two-way communication on the server.

In another configuration of the above example embodiment, the server may have an information publishing area corresponding to the one of the information processing devices and containing information related to the one of the information processing devices. The unspecified other one of the information processing devices may be allowed to access the information publishing area corresponding to the one of the information processing devices using second identification information possessed by the one of the information processing devices, and browse the information related to the one of the information processing devices.

With this configuration, the server has the information publishing area corresponding to the one of the information processing devices. The information publishing area corresponding to the one of the information processing devices can be accessed from the unspecified other one of the information processing devices, and therefore, the information related to the one of the information processing devices can be browsed by the user of the unspecified other one of the information processing devices. As a result, the user of the unspecified other one of the information processing devices can transmit a response to the user of the one of the information processing devices using the information related to the one of the information processing devices.

In another configuration of the above example embodiment, the response data accumulation unit may accumulate the response data in the information publishing area corresponding to the one of the information processing devices. The response data obtaining unit may obtain the response data accumulated in the information publishing area corresponding to the one of the information processing devices.

With this configuration, the response data from the unspecified other one of the information processing devices is accumulated in the information publishing area corresponding to the one of the information processing device. The one of the information processing devices can obtain the response data by accessing the information publishing area corresponding to itself. As a result, the one of the information processing devices can transmit a response to transmission data which that user has transmitted to the user of the unspecified other one of the information processing devices who that user has passed, and therefore, the users can perform two-way communication on the server.

In another configuration of the above example embodiment, the first identification information obtaining unit may obtain the first identification information and character data possessed by the unspecified other one of the information processing devices. The client transmission unit may transmit to the server the transmission data generated using the character data.

With this configuration, the user of the one of the information processing devices can obtain a character from the user of the unspecified other one of the information processing devices who that user has passed, and transmit transmission data generated based on the character to the user of the unspecified other one of the information processing devices who that user has passed. The character possessed by the user of the unspecified other one of the information processing devices can serves as a medium to motivate the users to start communication.

In another configuration of the above example embodiment, the unspecified other one of the information processing devices may include a request generation unit. The request generation unit may be configured to generate details of a request based on a user's input. The one of the information processing devices may include a details-of-request obtaining unit and a transmission data generation unit. The details-of-request obtaining unit may be configured to obtain via wireless communication the details of the request generated in the unspecified other one of the information processing devices. The transmission data generation unit may be configured to generate transmission data corresponding to the details of the request based on a user's input.

With this configuration, the unspecified other one of the information processing devices generates the details of a request. The one of the information processing devices obtains the details of the request, and generates transmission data corresponding to the details of the request. Because the details of the request are generated, the user of the one of the information processing devices which has obtained the details of the request is motivated to answer the request, and therefore, is motivated to communicate with the user of the unspecified other one of the information processing devices who that user has passed.

In another configuration of the above example embodiment, the one of the information processing devices may include a data obtaining unit and a data processing unit. The data obtaining unit may be configured to obtain, via wireless communication, predetermined data possessed by the unspecified other one of the information processing devices. The data processing unit may be configured to process the predetermined data based on a user's operation. The client transmission unit may transmit to the server the data processed by the data processing unit as the transmission data.

With this configuration, the one of the information processing devices obtains the predetermined data possessed by the unspecified other one of the information processing device, and processes and transmits the predetermined data to the server. The processed data is obtained by the unspecified other one of the information processing device. As a result, for example, the user of the unspecified other one of the information processing devices can transmit data to the user of the one of the information processing devices who that user has passed, and thereafter, obtain the data processed by the user of the one of the information processing devices. The user of the one of the information processing devices who has obtained the predetermined data is motivated to communicate with the user of the unspecified other one of the information processing devices by obtaining and processing the predetermined data, whereby the users who have passed each other can be prompted or induced to communicate with each other.

In another configuration of the above example embodiment, the one of the information processing devices may obtain the first identification information, and transmit second identification information possessed by the one of the information processing devices, via wireless communication. The unspecified other one of the information processing devices may transmit the first identification information, and obtain the second identification information, via wireless communication.

With this configuration, the one of the information processing devices and the unspecified other one of the information processing devices can exchange their identification information. As a result, the users who have passed each other can be prompted or induced to subsequently perform two-way communication.

In another configuration of the above example embodiment, the first identification information obtaining unit may obtain the first identification information via short-distance wireless communication.

With this configuration, the one of the information processing devices can obtain the first identification information from the unspecified other one of the information processing devices via short-distance wireless communication.

Another example embodiment is an information processing system including a plurality of information processing devices having a wireless communication function. One of the information processing devices includes a request generation unit and a first data transmission unit. The request generation unit is configured to generate details of a request based on a user's input. The first data transmission unit is configured to transmit first data indicating the details of the request and first identification information possessed by the one of the information processing devices, to an unspecified other one of the information processing devices located within a predetermined range from the one of the information processing devices. The unspecified other one of the information processing devices includes a first data obtaining unit, a details-of-request presentation unit, a second data generation unit, and a second data transmission unit. The first data obtaining unit is configured to obtain via wireless communication the first data indicating the details of the request and the first identification information possessed by the one of the information processing devices. The details-of-request presentation unit is configured to present the details of the request indicated by the first data to a user. The second data generation unit is configured to generate second data corresponding to the details of the request based on the user's input. The second data transmission unit is configured to transmit the second data to a server on a network using the first identification information. The one of the information processing devices also includes a second data obtaining unit configured to obtain the second data via the server.

With this configuration, the one of the information processing devices sets the details of a request. When the one of the information processing devices and the unspecified other one of the information processing devices are located within the predetermined range from each other, the unspecified other one of the information processing devices obtains the details of the request set by the one of the information processing devices. The unspecified other one of the information processing devices generates the second data corresponding to the details of the request based on the user's operation. The generated second data is obtained by the one of the information processing devices via the server. As a result, for example, the user of the one of the information processing devices can transmit a desired request to the user of the unspecified other one of the information processing devices who that user has passed, and obtain answer corresponding to the details of the request from the user of the unspecified other one of the information processing devices, whereby the users who have passed each other can communicate with each other. Because the user of the one of the information processing devices can transmit the details of a request to the user of the unspecified other one of the information processing devices who that user has passed, the user of the unspecified other one of the information processing devices can be motivated to answer the request.

In another configuration of the above example embodiment, the first data may include a predetermined object possessed by the one of the information processing devices. The request generation unit may generate the details of the request related to the predetermined object.

With this configuration, the predetermined object and the details of the request related to the object are transmitted to the unspecified other one of the information processing device. Therefore, the predetermined object can serve as a medium for communication, whereby the users who have passed each other are highly motivated to start communication.

In another configuration of the above example embodiment, the one of the information processing devices may include a response data generation unit and a response data transmission unit. The response data generation unit may be configured to generate response data indicating a response to the second data based on the user's operation. The response data transmission unit may be configured to transmit the response data to the server. The unspecified other one of the information processing devices may obtain the response data via the server.

With this configuration, the user of the one of the information processing devices can respond to answer from the user of the unspecified other one of the information processing devices who that user has passed, and the user of the unspecified other one of the information processing devices can obtain the response. As a result, the users can perform two-way communication.

In another configuration of the above example embodiment, the server may have information related to the one of the information processing devices. The unspecified other one of the information processing devices may be allowed to browse the information related to the one of the information processing devices by accessing the server using the first identification information.

With this configuration, the unspecified other one of the information processing devices can obtain the information related to the one of the information processing devices from the server. As a result, the user of the unspecified other one of the information processing devices can obtain the information related to the one of the information processing devices in addition to the details of the request, and therefore, based on that information, can generate second data corresponding to the details of the request.

In another configuration of the above example embodiment, the server may have an information publishing area corresponding to the one of the information processing devices. The information related to the one of the information processing devices may be contained in the information publishing area corresponding to the one of the information processing devices. The second data transmitted to the server by the second data transmission unit may be accumulated in the information publishing area corresponding to the one of the information processing devices. The second data obtaining unit may access the information publishing area corresponding to the one of the information processing devices to obtain the second data.

With this configuration, the information publishing area corresponding to the one of the information processing devices is provided in the server. The information related to the one of the information processing devices is contained in the information publishing area. The second data is also accumulated in the information publishing area corresponding to the one of the information processing devices. Therefore, the user of the one of the information processing devices can obtain various pieces of second data from the user of the unspecified other one of the information processing devices who that user has passed, by accessing the information publishing area corresponding to the one of the information processing devices.

In another configuration of the above example embodiment, the server may have an information publishing area corresponding to the unspecified other one of the information processing devices and containing the information related to the unspecified other one of the information processing devices. The one of the information processing devices may be allowed to browse the information related to the unspecified other one of the information processing devices by accessing the information publishing area corresponding to the unspecified other one of the information processing devices using second identification information possessed by the unspecified other one of the information processing devices.

With this configuration, the information publishing area corresponding to the unspecified other one of the information processing devices is provided. The one of the information processing devices can browse the information related to the unspecified other one of the information processing devices by accessing the information publishing area using the second identification information. As a result, for example, the user of the one of the information processing devices can obtain the information related to the unspecified other one of the information processing devices to communicate with the user of the unspecified other one of the information processing devices.

In another configuration of the above example embodiment, the one of the information processing devices may include a response data generation unit and a response data transmission unit. The response data generation unit may be configured to generate response data indicating a response to the second data based on the user's operation. The response data transmission unit may be configured to transmit the response data to the server using the second identification information. The server may accumulate the response data in the information publishing area corresponding to the unspecified other one of the information processing devices. The unspecified other one of the information processing devices may access the information publishing area corresponding to the unspecified other one of the information processing devices to obtain the response data.

With this configuration, the response data from the one of the information processing devices can be accumulated in the information publishing area corresponding to the unspecified other one of the information processing devices. As a result, the user of the unspecified other one of the information processing devices can obtain the response data from the user of the one of the information processing devices who that user has passed, by accessing the information publishing area corresponding to the unspecified other one of the information processing devices. The users also perform two-way communication in the information publishing area provided in the server.

In another configuration of the above example embodiment, the server may have an information publishing area corresponding to the one of the information processing devices and containing information related to the predetermined object. The unspecified other one of the information processing devices may be allowed to browse the information related to the predetermined object by accessing the information publishing area corresponding to the one of the information processing devices using the first identification information.

With this configuration, the information related to the predetermined object is contained in the information publishing area corresponding to the one of the information processing devices. The unspecified other one of the information processing devices can browse the information related to the predetermined object by accessing the information publishing area corresponding to the one of the information processing devices. On the other hand, the first data indicating the details of the request from the one of the information processing devices includes the predetermined object. The unspecified other one of the information processing devices can obtain the information related to the predetermined object from the server. Therefore, the predetermined object can serve as a medium for communication, whereby the users who have passed each other are more highly motivated to communicate with each other.

In another configuration of the above example embodiment, the predetermined object may be a character of the user of the one of the information processing devices. The request generation unit may generate a request to process the character.

With this configuration, the character of the user of the one of the information processing devices can be transmitted along with the request to process the character to the unspecified other one of the information processing device. Therefore, the character can serve as a medium for communication.

In another configuration of the above example embodiment, the one of the information processing devices may include a second identification information obtaining unit configured to obtain second identification information possessed by the unspecified other one of the information processing devices via wireless communication. The unspecified other one of the information processing devices may include an identification information transmission unit configured to transmit the second identification information possessed by the unspecified other one of the information processing devices.

With this configuration, the one of the information processing devices and the unspecified other one of the information processing devices can exchange their identification information. As a result, the users who have passed each other can be prompted or induced to subsequently perform two-way communication.

Another example embodiment is an information processing system including a plurality of information processing devices having a wireless communication function. One of the information processing devices includes a data obtaining unit, a data processing unit, and a processed data transmission unit. The data obtaining unit is configured to obtain, via wireless communication, first identification information and predetermined data which arepossessed by an unspecified other one of the information processing devices located within a predetermined range from the one of the information processing devices. The data processing unit is configured to process the predetermined data based on a user's operation. The processed data transmission unit is configured to transmit the data processed by the data processing unit to a server on a network using the first identification information. The unspecified other one of the information processing devices includes a processed data obtaining unit configured to obtain the processed data via the server.

With this configuration, when the one of the information processing devices and the unspecified other one of the information processing devices are located within the predetermined range from each other, the one of the information processing devices obtains the predetermined data possessed by the unspecified other one of the information processing devices. The one of the information processing devices processes the obtained predetermined data based on the user's operation. Thereafter, the processed data is obtained by the unspecified other one of the information processing devices via the server. As a result, for example, the user of the unspecified other one of the information processing devices transmits data to the user of the one of the information processing devices who that user has passed, and thereafter, can obtain the data processed by the user of the one of the information processing devices, and therefore, can subsequently communicate with the user of the one of the information processing devices who that user has passed.

In another configuration of the above example embodiment, the unspecified other one of the information processing devices may include a request setting unit configured to set a request to process the predetermined data based on a user's operation. When the request to process the predetermined data has been set, the data processing unit may process the predetermined data.

With this configuration, the unspecified other one of the information processing devices can set the request to process the predetermined data. As a result, only data for which the process request has been set is processed by the one of the information processing devices, and the unspecified other one of the information processing devices can obtain the processed data. By setting the process request, the user is prompted or induced to subsequently perform communication.

In another configuration of the above example embodiment, the request setting unit may set details of the request to process the predetermined data based on the user's operation. The data obtaining unit may also obtain the details of the request set by the request setting unit.

With this configuration, the user of the unspecified other one of the information processing devices can set the details of the process request based on his or her own preference or the like.

In another configuration of the above example embodiment, the unspecified other one of the information processing devices may include an evaluation data generation unit and an evaluation data transmission unit. The evaluation data generation unit may be configured to generate evaluation data indicating an evaluation result with respect to the processed data based on the user's operation. The evaluation data transmission unit may be configured to transmit the evaluation data to the server. The one of the information processing devices may include an evaluation data obtaining unit configured to obtain the evaluation data via the server.

With this configuration, the user of the one of the information processing devices can obtain the evaluation result with respect to the data processed by itself from the user of the unspecified other one of the information processing devices. As a result, the users can perform two-way communication, resulting in active communication.

In another configuration of the above example embodiment, the one of the information processing devices may have material data which is used in the processing of the predetermined data. The data processing unit may process the predetermined data using the material data.

With this configuration, the predetermined data can be processed based on the material data possessed by the one of the information processing devices. As a result, the user of the unspecified other one of the information processing devices can obtain data which has been processed using material data which is not possessed by the user. The user of the unspecified other one of the information processing devices can also obtain processed data in various forms. Therefore, the user of the unspecified other one of the information processing devices is motivated to set a request to process data, leading to active communication between the users.

In another configuration of the above example embodiment, the predetermined data may be character data indicating a character possessed by the unspecified other one of the information processing devices. The data processing unit may change a display form of the character by processing the character data.

With this configuration, the character can serve as a medium for communication between the users who have passed each other.

In another configuration of the above example embodiment, the server may have information related to the unspecified other one of the information processing devices. The one of the information processing devices may be allowed to browse the information related to the unspecified other one of the information processing devices by accessing the server using the first identification information.

With this configuration, the server stores the information related to the unspecified other one of the information processing devices. The user of the one of the information processing devices can browse the information related to the unspecified other one of the information processing devices by accessing the server using the obtained first identification information. In other words, the user of the one of the information processing devices can obtain the information related to the unspecified other one of the information processing devices in addition to the obtained predetermined data. Therefore, the user of the one of the information processing devices can be motivated to process and transmit the predetermined data to the unspecified other one of the information processing device, likely leading to communication between the users who have passed each other.

In another configuration of the above example embodiment, the server may have an information publishing area corresponding to the unspecified other one of the information processing devices. The server may accumulate the processed data transmitted from the one of the information processing devices in the information publishing area corresponding to the unspecified other one of the information processing devices. The processed data obtaining unit may access the information publishing area corresponding to the unspecified other one of the information processing devices to obtain the processed data.

With this configuration, the information publishing area corresponding to the unspecified other one of the information processing devices is provided on the server. The processed data is accumulated in the information publishing area. The unspecified other one of the information processing devices can obtain various pieces of processed data by accessing the information publishing area corresponding to itself.

In another configuration of the above example embodiment, the one of the information processing devices may obtain the first identification information and the predetermined data, and transmit second identification information possessed by the one of the information processing devices, via wireless communication. The unspecified other one of the information processing devices may transmit the first identification information, and obtain the second identification information, via wireless communication.

With this configuration, the one of the information processing devices and the unspecified other one of the information processing devices can exchange their identification information. As a result, the users who have passed each other can be prompted or induced to subsequently perform two-way communication.

Note that another example of each of the above embodiments may be the information processing device and the server included in the information processing system, or a program executed by the information processing device and the server. Another example of each of the above embodiments may be an information processing method performed in the information processing system.

According to the above example embodiments, one user can exchange data with an unspecified other user when the users pass each other, and thereafter, the users can communicate with each other.

These and other objects, features, aspects and advantages of the present example embodiment will become more apparent from the following detailed description of the present example embodiment when taken in conjunction with the accompanying drawings.

BRIEF DESCRIPTION OF THE DRAWINGS

FIG. 13 is a flowchart showing an example non-limiting flow of a process executed by the server 50;

FIG. 14 is a diagram showing a destination to which data transmitted to the server 50 is stored, and data which is stored;

FIG. 18 is a diagram showing example non-limiting kinds of data stored in the game device 10A;

DETAILED DESCRIPTION OF NON-LIMITING EXAMPLE EMBODIMENTS (Configuration of Game Device)

Figure 1:
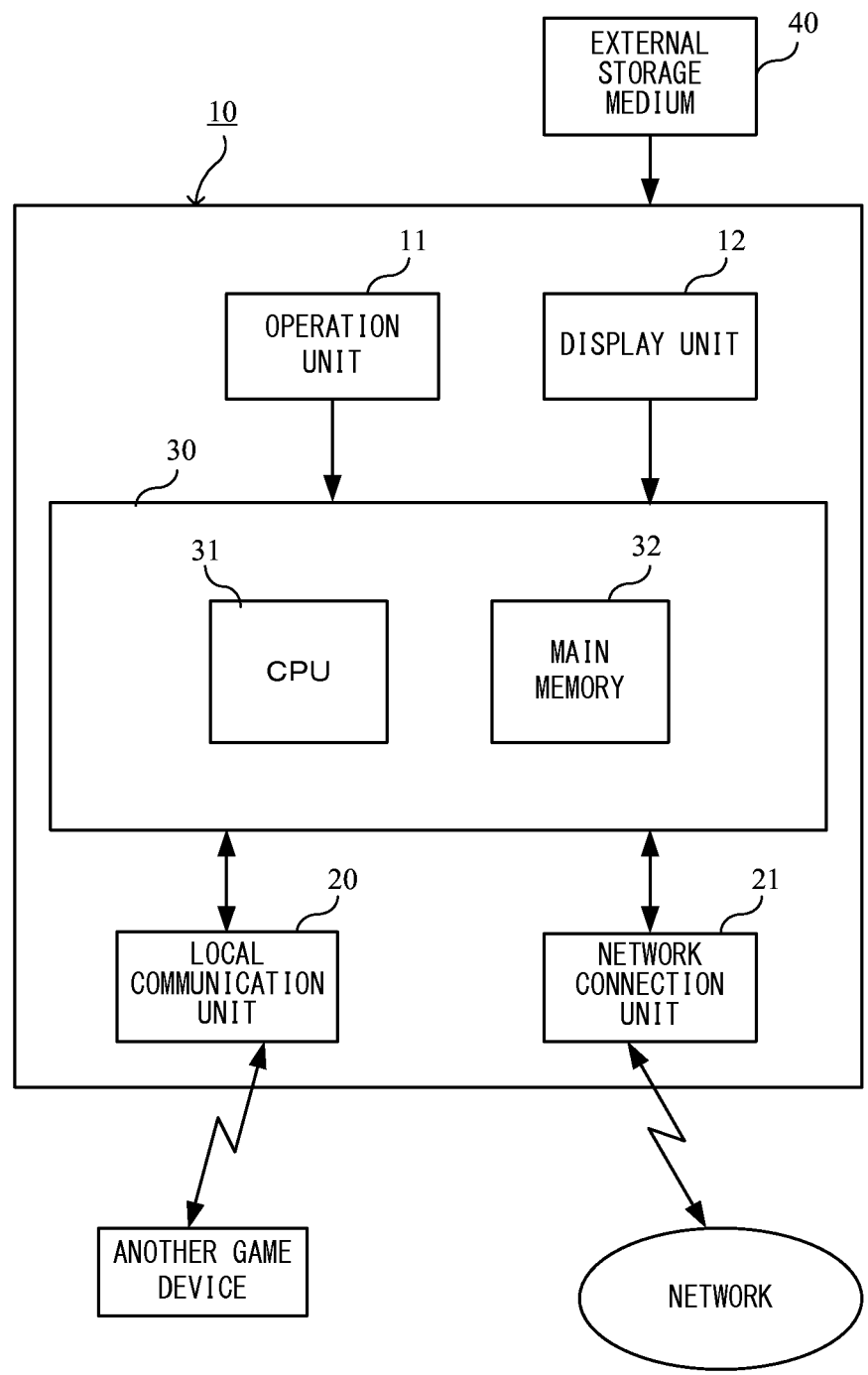
FIG. 1 is a diagram showing an example non-limiting configuration of a game device 10.

A game device 10 according to an example embodiment will be described hereinafter with reference to the accompanying drawings. FIG. 1 is a block diagram showing a configuration of the game device 10. In FIG. 1, the game device 10 includes an operation unit 11, a display unit 12, a local communication unit 20, a network connection unit 21, and an information processing unit 30. The information processing unit 30 includes a CPU 31 and a main memory 32. The game device 10 is a portable game device. The units are accommodated in a housing. Note that the game device 10 may be foldable.

The operation unit 11 receives the user's input to the game device 10. The operation unit 11 may include a plurality of operation buttons, a cross-switch, a touch panel, and the like. The display unit 12 is, for example, a liquid crystal display device or an organic EL display device. A touch panel may be provided on a screen of the display unit 12.

The local communication unit 20 has a function of wirelessly communicating with another device (another game device 10 or other devices) which is located within a predetermined range (e.g., several meters to several tens of meters) from the game device 10. The network connection unit 21 has a function of connecting the game device 10 to a network (e.g., the Internet) wirelessly or through a wired connection (e.g., connecting the game device 10 to a wireless LAN using a scheme complying with IEEE 802.11.b/g standards). Note that the local communication unit 20 and the network connection unit 21 may be implemented as a single communication module or separate communication modules.

The CPU 31 executes a predetermined program to execute a process described below. The main memory 32 is a volatile memory which is used as a work or buffer area for the CPU 31.

A replaceable external storage medium 40 is connected to the game device 10. The external storage medium 40 may be a non-volatile memory, or an optical disk, a magnetic disk, or the like. The external storage medium 40 stores a predetermined program.

Note that the game device 10 is only for illustrative purposes, and a game process (information process) described below may be executed in any other devices.

Figure 2:
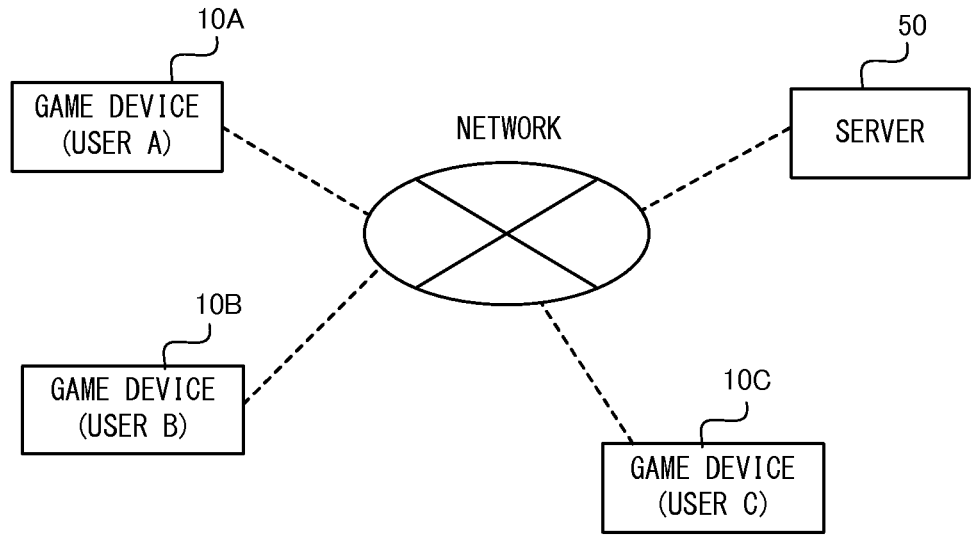
FIG. 2 is a diagram showing an example non-limiting information processing system including a plurality of game devices 10 (game devices 10A to 10C) and a server.

FIG. 2 is a diagram showing an example non-limiting information processing system including a plurality of the game devices 10 (the game devices 10A to 10C) and a server. As described above, the game devices 10 each include the network connection unit 21, and therefore, can be connected via the network connection unit 21 to a network (e.g., the Internet). As shown in FIG. 2, the game device 10A is used by a user A, the game device 10B is used by a user B, and the game device 10C is used by a user C. The game devices 10A to 10C can be connected via the network to the server 50. The server 50 may function as, for example, a web server. The server 50 transmits a web content to each game device 10 in response to a request from the game device 10. The content may be displayed on the display unit 12 of the game device 10.

The game device 10 is a portable game device and is carried and moved by the user. For example, the game devices 10A and 10B can perform local communication (short-distance communication (also referred to as "StreetPass" communication)) while the user A carrying the game device 10A and the user B carrying the game device 10B are passing each other.

Figure 3:
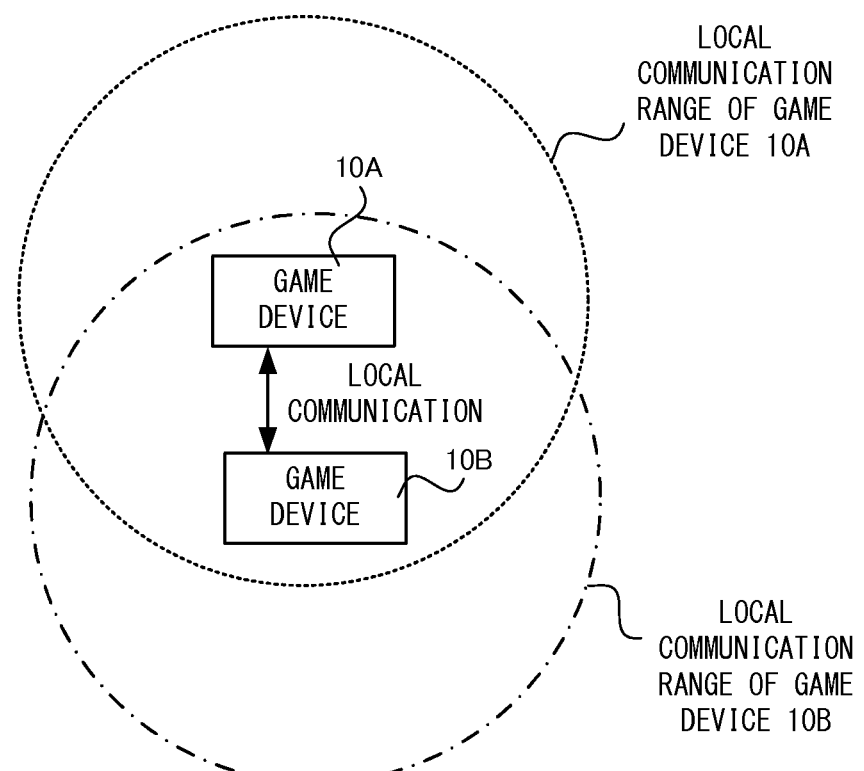
FIG. 3 is a diagram showing how the game devices 10A and 10B perform local communication while users A and B are passing each other.

FIG. 3 is a diagram showing how the game devices 10A and 10B can perform local communication while the users A and B are passing each other. As shown in FIG. 3, the game device 10A can perform local communication within a predetermined range (e.g., a circular range with a radius of several meters to several tens of meters) from the game device 10A as the center. The game device 10B can also perform local communication within the predetermined range from the game device 10B as the center. When the game devices 10A and 10B are set to a mode in which local communication is enabled and are each located within the local communication range from the other, local communication is performed between the game devices 10A and 10B. When local communication is performed, the game devices 10A and 10B exchange data. The exchanged data is used in a process of each example embodiment described below.

(First Example Embodiment)

Next, an example process will be described which is performed in the above information processing system including the game devices 10A and 10B and the server 50. In this example embodiment, for example, the user A operating the game device 10A and the user B operating the game device 10B are strangers to each other. The users A and B start communicating with each other via the server 50, for example, after the users A and B have passed each other in a town. Firstly, a flow of the process in the first example embodiment will be briefly described with reference to FIG. 4.

Figure 4:
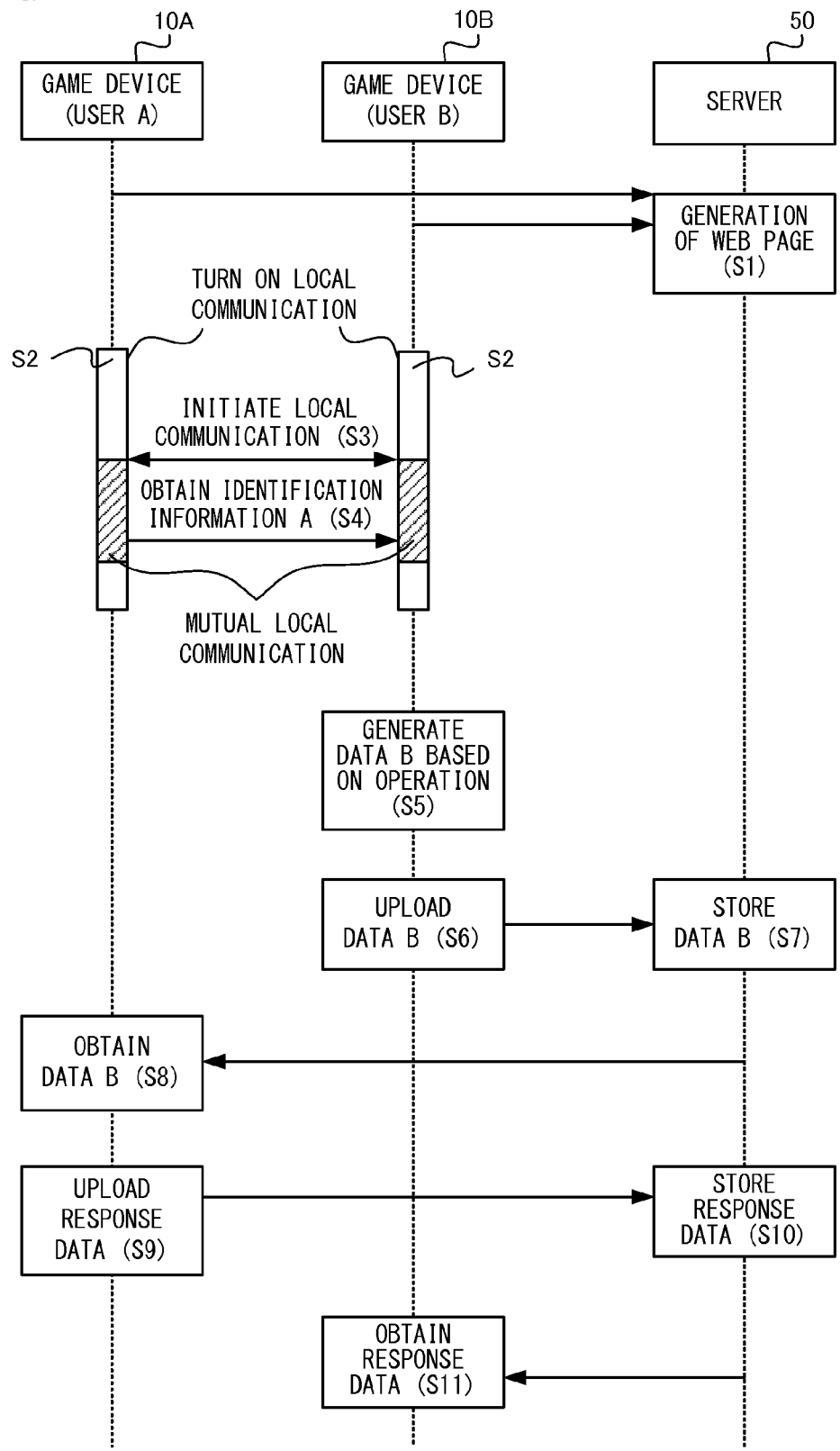
FIG. 4 is a diagram schematically showing an example non-limiting process according to a first example embodiment which is performed in the information processing system including the game devices 10A and 10B and the server 50.

FIG. 4 is a diagram schematically showing the process of the first example embodiment in the information processing system including the game devices 10A and 10B and the server 50.

In this example embodiment, it is assumed that web pages are previously produced in the server 50. As shown in FIG. 4, a web page is generated in the server 50 for each user in response to the user's request from the game device 10 (step S1). Specifically, the server 50 generates a web page A in response to a web page generation request from the game device 10A (the user A), and a web page B in response to a web page generation request from the game device 10B (the user B). The web page A corresponds to the game device 10A (the user A) and is dedicated to the user A. The web page B corresponds to the game device 10B (the user B) and is dedicated to the user B. A web page dedicated to each user is partially published for other users. For example, the user A can browse the public portion of the user B's page. Each user can customize his or her own web page on his or her own to publish information about himself or herself to other users.

Note that each user may have another virtual area instead of his or her own web page. For example, when a plurality of the game devices 10 are connected to the server and an on-line game is conducted on the server, a virtual place (area) may be provided in a virtual world constructed on the server for each user. Each user can customize his or own virtual place (e.g., a house or a territory), in which information specific to the user is stored. In addition to accessing his or her own place, one user may access another user's place to browse information about that user.

Next, in step S2, in the game devices 10A and 10B, local communication is enabled or turned on (the game devices 10A and 10B are set to a mode in which the game devices 10A and 10B are allowed to perform local communication). The users go out while carrying the game devices 10, and pass each other in, for example, a train or a bus.

Next, when a distance between the game devices 10A and 10B becomes a predetermined value or less, local communication is initiated between the game devices 10A and 10B (step S3). After the initiation of local communication, in step S4 the game device 10B obtains, from the game device 10A, data containing identification information A (information for accessing the web page A on the server 50) stored in the game device 10A. The identification information A is possessed by the game device 10A and is specific to the game device 10A (the user A). Also, in step S4, the game device 10A obtains, from the game device 10B, data containing identification information B (information for accessing the web page B on the server 50) stored in the game device 10B. The identification information B is possessed by the game device 10B and is specific to the game device 10B (the user B). As a result, the game devices 10A and 10B exchange their identification information. Note that, in step S4, in addition to the identification information, other information may be obtained, such as a message to unspecified other users which has been generated by the user A or image data stored in the game device 10A. Thereafter, when the game devices 10A and 10B are separated from each other by a distance, the game devices 10A and 10B cannot perform local communication.

Next, the user B recognizes in the game device 10B that the game device 10B has obtained the identification information A from the game device 10A. In other words, the user B recognizes that he or she has passed an unspecified user (the user A). Thereafter, the user B generates data B using the operation unit 11 of the game device 10B (step S5). The data B is generated by the user B's operation, and may be, for example, a message (a string of letters etc.), an image, or a character (e.g., a game character) which is generated by the user B.

Next, in step S6, the generated data B is uploaded to the server 50. Specifically, the game device 10B connects to, for example, the Internet using the network connection unit 21, and transmits the data B to the server 50. The server 50 stores the uploaded data B to a storage device of itself or another apparatus (step S7). Note that the data B which is transmitted from the game device 10B and is stored in the server 50 is not limited to data generated by the user, and may be, for example, data such as a photograph stored in the game device 10B.

Next, the user A accesses the server 50 using the game device 10A to obtain the data B stored in the server 50 (step S8). The user A views the obtained data B (e.g., a message) on the display unit 12 of the game device 10A, and uploads, to the server 50, response data indicating a response to the data B (step S9). The server 50 stores the response data transmitted from the game device 10A (step S10). Thereafter, the user B (the game device 10B) accesses the server 50 to obtain the response data from the server 50 (step S11).

Figure 5:
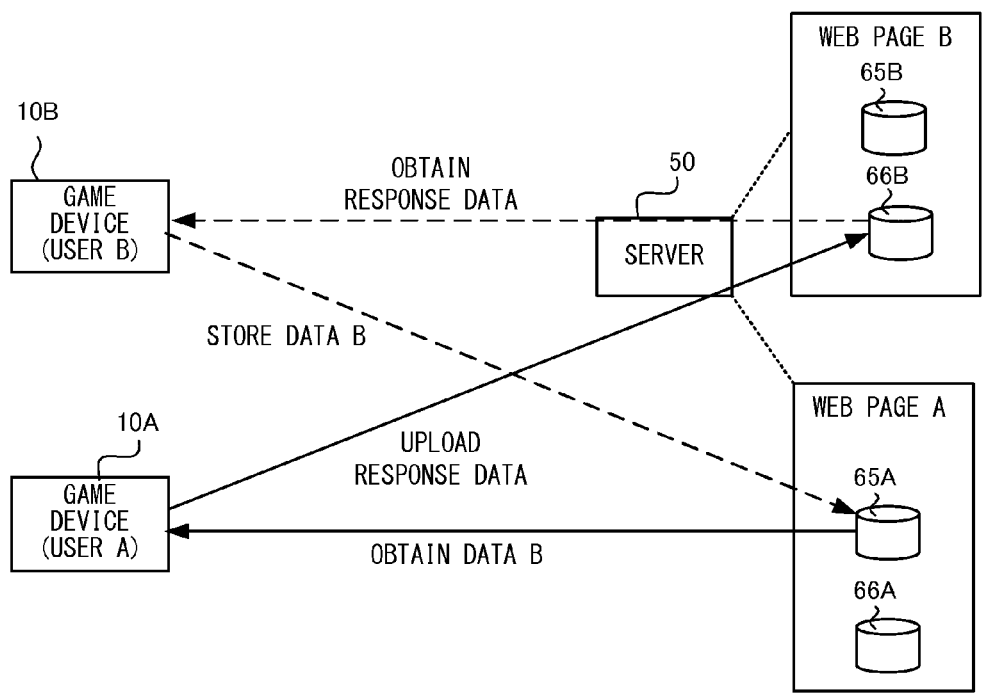
FIG. 5 is a diagram schematically showing example non-limiting communication between the game devices 10A and 10B and the server 50 which is performed in steps S6 to S11 of FIG. 4.

The process flow of steps S6 to S11 will be described with reference to FIGS. 5 and 6. FIG. 5 is a diagram schematically showing communication between the game devices 10A and 10B and the server 50 which is performed in steps S6 to S11 of FIG. 4. As shown in FIG. 5, the game device 10B stores the data B generated by itself to a collection data box 65A in the web page A provided on the server 50. The collection data box 65 is provided in each web page to store data from other users. Next, the game device 10A obtains the data B from the collection data box 65A in the web page A on the server 50. The game device 10A stores response data to a response data box 66B in the web page B on the server 50. The response data box 66 is provided in each web page to store response data from other users. Thereafter, the game device 10B accesses the web page B corresponding to itself to obtain the response data stored in the response data box 66B.

Figure 6:
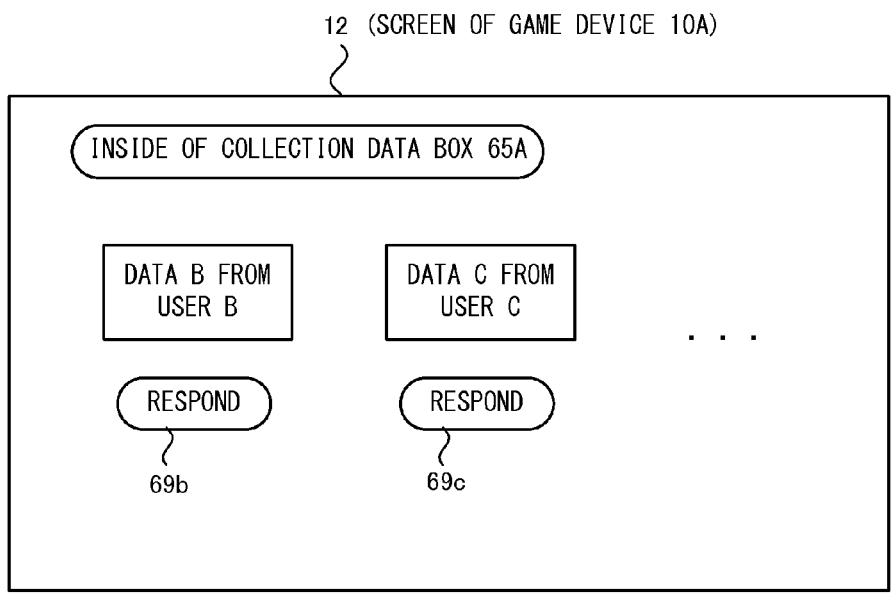
FIG. 6 is a diagram showing an example non-limiting image which is displayed on a screen of the game device 10A when the user A accesses a collection data box 65A in a web page A on the server 50.

FIG. 6 is a diagram an example non-limiting image which is displayed on the screen of the game device 10A when the user A accesses the collection data box 65A in the web page A on the server 50. The collection data box 65 is a storage area for storing (accumulating) data which has been generated by other users in step S5, and is provided in each web page. For example, when a user accesses his or her own web page on the server 50, an image indicating a link for accessing the collection data box 65 is displayed. By selecting the image, the user can view data in the collection data box 65. Note that each user is allowed to view data in the collection data box 65 of his or her own web page, and is not allowed to view data in the collection data boxes 65 of other users' web pages.

As shown in FIG. 6, the collection data box 65A stores the data B which has been generated and uploaded to the web page A by the user B and the data C which has been generated and uploaded to the web page A by the user C, and the like. In other words, the collection data box 65A of the web page A stores data which has been generated by a plurality of other users which have passed the user A. The user A can view data (e.g., a message) from other users and respond to the data. For example, as shown in FIG. 6, images 69 for responding to data from other users are displayed, and the user A may select the images 69. For example, if the user A selects an image 69*b*, a canned (predetermined) response message is uploaded to the response data box 66B of the web page B. Alternatively, if the user A selects the image 69b, a screen for generating a response message may be displayed, and a response message generated by the user A may be uploaded to the response data box 66B of the web page B. Thereafter, the user B may view the user A's response to the data B generated by the user B, by accessing the response data box 66B of the web page B on the server 50 using the game device 10B. Note that the user A can browse web pages of users which have transmitted data. The collection data box 65A stores data transmitted by a game device 10 in association with identification information (the URL of a web page) of the game device 10. The user A can browse the web pages of other users which have transmitted data, by accessing the server 50 based on the identification information of those users.

Thus, when the user A (the game device 10A) and the user B (the game device 10B) pass each other, local communication is performed therebetween (step S3). The game device 10B obtains the identification information A from the game device 10A via local communication (step S4). In the game device 10B, the data B is generated based on the user B's operation (step S5), and the generated data B is uploaded to the server 50 (step S6). Next, the user A obtains the data B generated by the user B from the server 50 (step S8), and uploads response data to the server 50 (step S9). Thereafter, the user B obtains the response data from the server 50 using the game device 10B (step S11). Thus, the users A and B can communicate with each other via the server 50 after having passed each other.

Note that the user B obtains the identification information A via local communication to browse the web page A dedicated to the user A, thereby obtaining information related to the user A, and based on the information, generating the data B which is to be transmitted to the user A. The user C, who is different from the users A and B, can browse the web page A based on the identification information A even when the user C has not passed the user A. For example, the server 50 has a search function and allows the user C to search for and access the web page A of the user A using various pieces of information related to the user A. Specifically, the web page of each user is published to all other users. A user who knows the identification information A (URL) of the web page A, a user who has obtained the identification information A via local communication, a user who has obtained the identification information A by searching, and a user who has accessed the server 50 by accidentally inputting the identification information A by generating random inputs, can browse the web page A. In particular, a user who has obtained the identification information A via local communication can easily browse the web page A and therefore can be prompted or induced to browse the web page A.

(Details of Game Process of First Example Embodiment)

Figure 7:
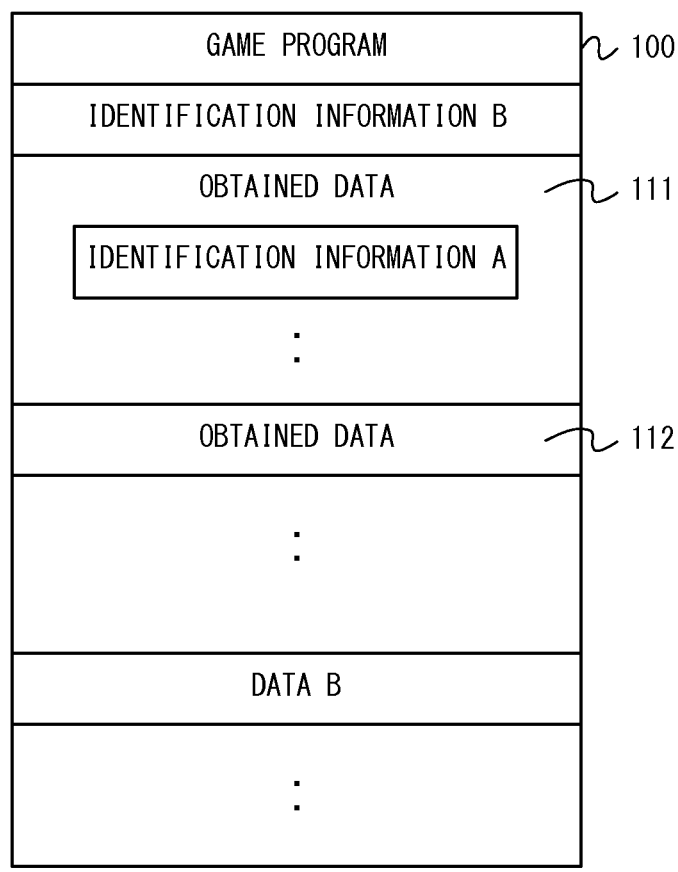
FIG. 7 is a diagram showing various example non-limiting kinds of data stored in the game device 10B.
Figure 8:
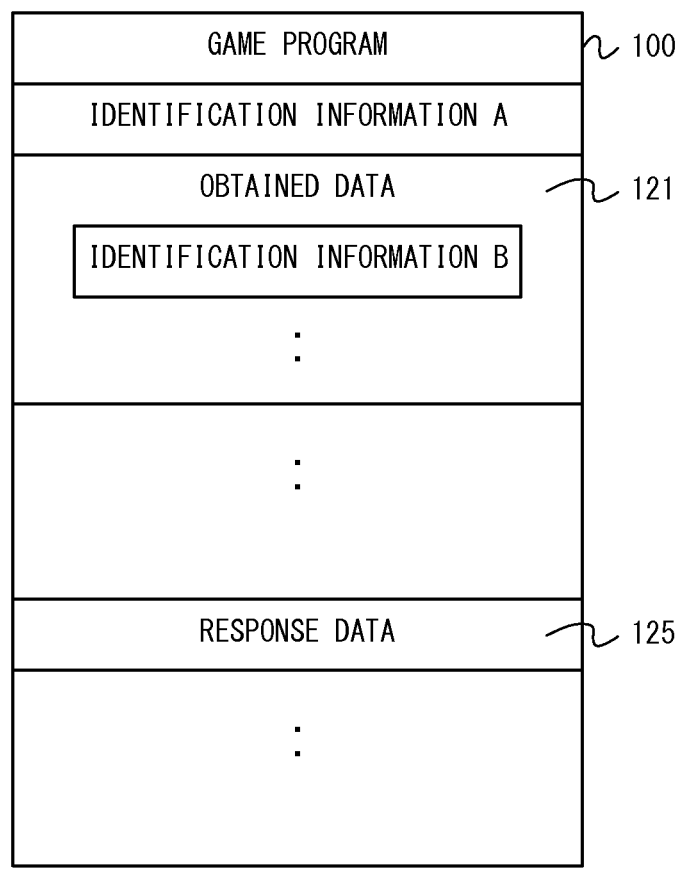
FIG. 8 is a diagram showing various example non-limiting kinds of data stored in the game device 10A.

Next, an information process of the first example embodiment which is executed in this information processing system will be described in detail. A case where the game device 10B generates the data B, and the data B is obtained by the game device 10A, will be described hereinafter. Firstly, various kinds of data used in the game process will be described. FIG. 7 shows various example non-limiting kinds of data stored in the game device 10B. FIG. 8 shows various example non-limiting kinds of data stored in the game device 10A.

As shown in FIG. 7, the main memory 32 of the game device 10B stores a game program 100, the identification information B, obtained data 111, obtained data 112, and the data B.

The game program 100 is used to execute the information process of this example embodiment. The game program 100 is read from the external storage medium 40 and stored to the main memory 32 at an appropriate timing after the game device 10 is powered on.

The identification information B corresponds to the game device 10B and is specific to the game device 10B (the user B). The identification information B is related to the web page B on the server 50 corresponding to the game device 10B. Specifically, the identification information B is an URL (or a portion of the URL) for accessing the web page B.

The obtained data 111 is data which has been obtained from the game device 10A via local communication and includes the identification information A. The identification information A is related to the web page A on the server 50 corresponding to the game device 10A. Specifically, the identification information A is an URL for accessing the web page A.

The obtained data 112 is data which has been obtained from the game device 10C via local communication and includes the identification information C corresponding to the game device 10C. The data B is data which has been transmitted from the game device 10B to the server 50 and is accumulated in the server 50. The data B may be, for example, data (e.g., data indicating a message) generated by the user B's operation or data (e.g., image data) previously stored in the game device 10B.

As shown in FIG. 8, the main memory 32 of the game device 10A stores the game program 100, the identification information A, obtained data 121, and response data 125. The identification information A corresponds to the game device 10A and is specific to the game device 10A (the user A). Specifically, the identification information A is used to access the web page A on the server 50 corresponding to the game device 10A. The obtained data 121 is data which has been obtained from the game device 10B via local communication and includes the identification information B. The response data 125 indicates a response which is transmitted to the server 50.

Figure 9:
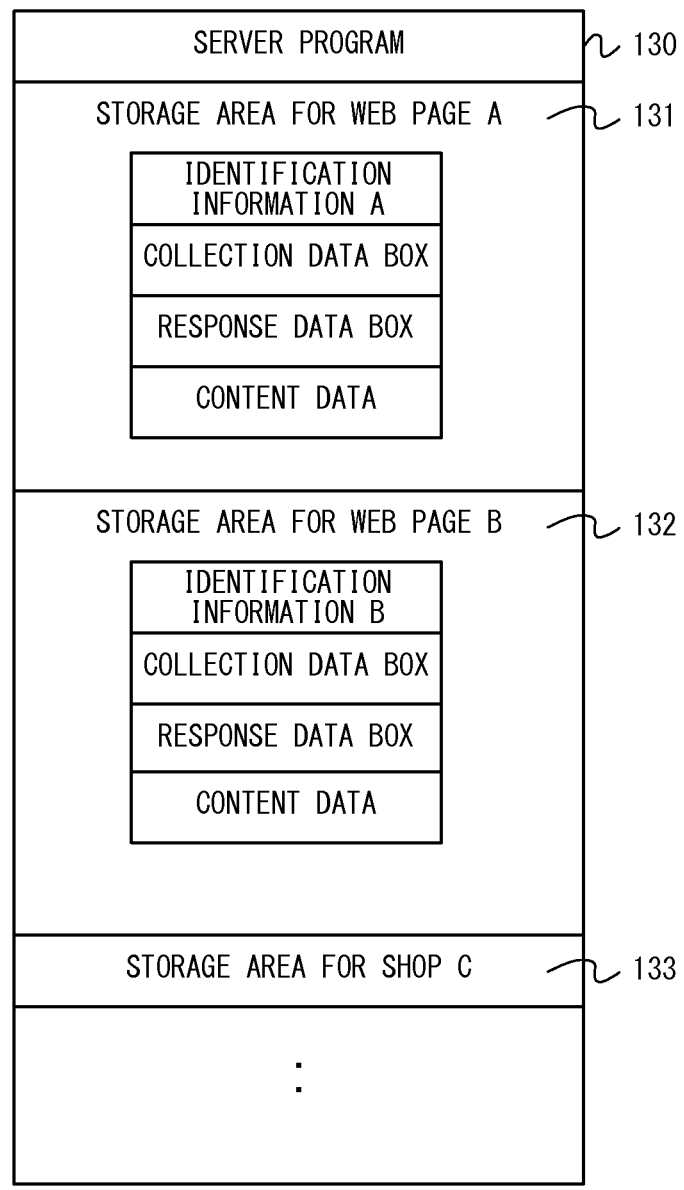
FIG. 9 is a diagram showing various example non-limiting kinds of data stored in the server 50.

FIG. 9 is a diagram showing various example non-limiting kinds of data stored in the server 50. FIG. 9 shows main data stored in storage means of the server 50, such as a memory or a magnetic disk. As shown in FIG. 9, the storage means of the server 50 stores a server program 130. The storage means of the server 50 also has a storage area 131 for the web page A, a storage area 132 for the web page B, a storage area 133 for the web page C, and the like.

The server program 130 is executed by a CPU of the server 50. The server program 130 is read from, for example, a magnetic disk connected to the server 50, and is stored to the memory of the server 50, at an appropriate timing after the server 50 is powered on.

The storage area 131 for the web page A stores the identification information A. The storage area 131 for the web page A also has a collection data box and a response data box. The storage area 131 for the web page A also has an area for storing content data (data in the web page, such as characters and images). The content data of the web page A includes data which has been generated and edited by the user A. The storage area 132 for the web page B and the storage area 133 for the web page C also store data similar to those of the storage area 131 for the web page A.

Figure 10:
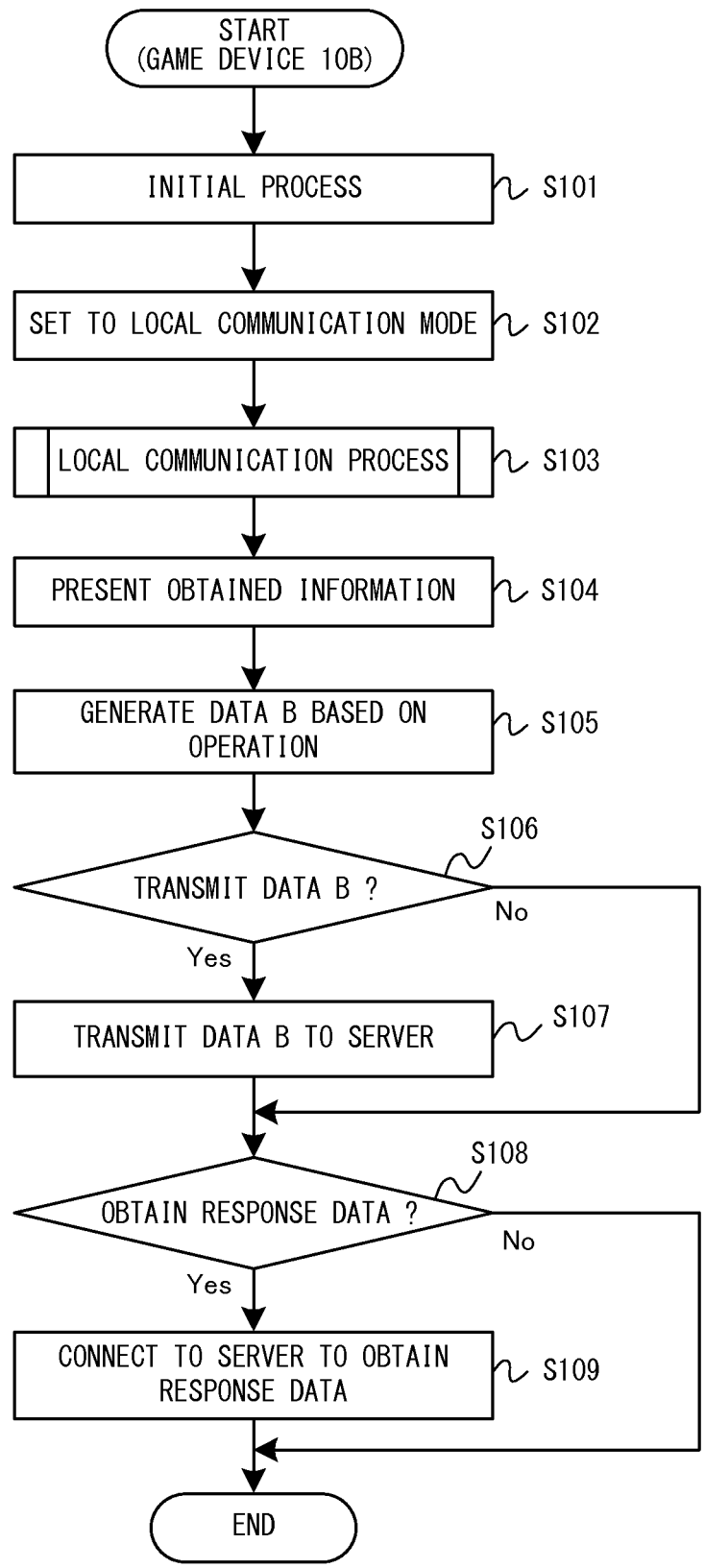
FIG. 10 is a main flowchart showing an example non-limiting flow of a main process executed by the game device 10B.

Next, a game process performed by the game device 10A, the game device 10B, and the server 50 will be described in detail with reference to FIGS. 10 to 13. FIG. 10 is a main flowchart showing an example non-limiting flow of a main process executed by the game device 10B. When the game device 10B is powered on, the CPU 31 of the game device 10B executes a boot program stored in a boot ROM (not shown) to initialize units such as the main memory 32. Thereafter, the game program stored in the external storage medium 40 is read into the main memory 32, and the CPU 31 starts executing the game program. The process shown in the flowchart of FIG. 10 is performed after completion of the above process.

Note that the steps of the flowchart of FIGS. 10 to 13 are only for illustrative purposes, and the order in which the steps are performed may be changed if a similar effect is obtained. While, in this example embodiment, the steps of the flowchart are executed by the CPU 31, a portion of the steps of the flowchart may be executed by a processor or a dedicated circuit other than the CPU 31.

Initially, in step S101, the game device 10B executes an initial process. The initial process is executed when the identification information B is not stored in the game device 10B. For example, the initial process is executed when the user B starts executing the game program 100 in the game device 10B for the first time. For example, in the initial process, the game device 10B connects to the server 50 via the Internet, and transmits to the server 50 an instruction to generate the web page B. Thereafter, the game device 10B obtains from the server 50 the identification information B which is generated when the web page B is generated on the server 50. When the identification information B is obtained, the identification information B is stored to the main memory 32 of the game device 10B, the external storage medium 40, or other non-volatile internal storage media (not shown). Also, in the initial process, when the web page B is generated on the server 50, the web page B is customized by the user B' operation on his or her own. For example, the layout of the web page may be changed by the user B, or information related to the user B may be presented on the web page. The game device 10B executes step S102 after step S101.

In step S102, the game device 10B is set to the local communication mode based on the user B's operation. For example, when the user B presses a predetermined operation button on the operation unit 11, the game device 10B is set to the local communication mode. In the local communication mode, the game device 10B is allowed to perform local communication with another game device(s) 10. Next, the game device 10B executes step S103.

In step S103, the game device 10B executes a local communication process. In the local communication process, the game device 10B performs local communication ("Street-Pass" communication) with another game device(s) 10 until the local communication mode is ended. The local communication process will be described in detail hereinafter with reference to FIG. 11.

Figure 11:
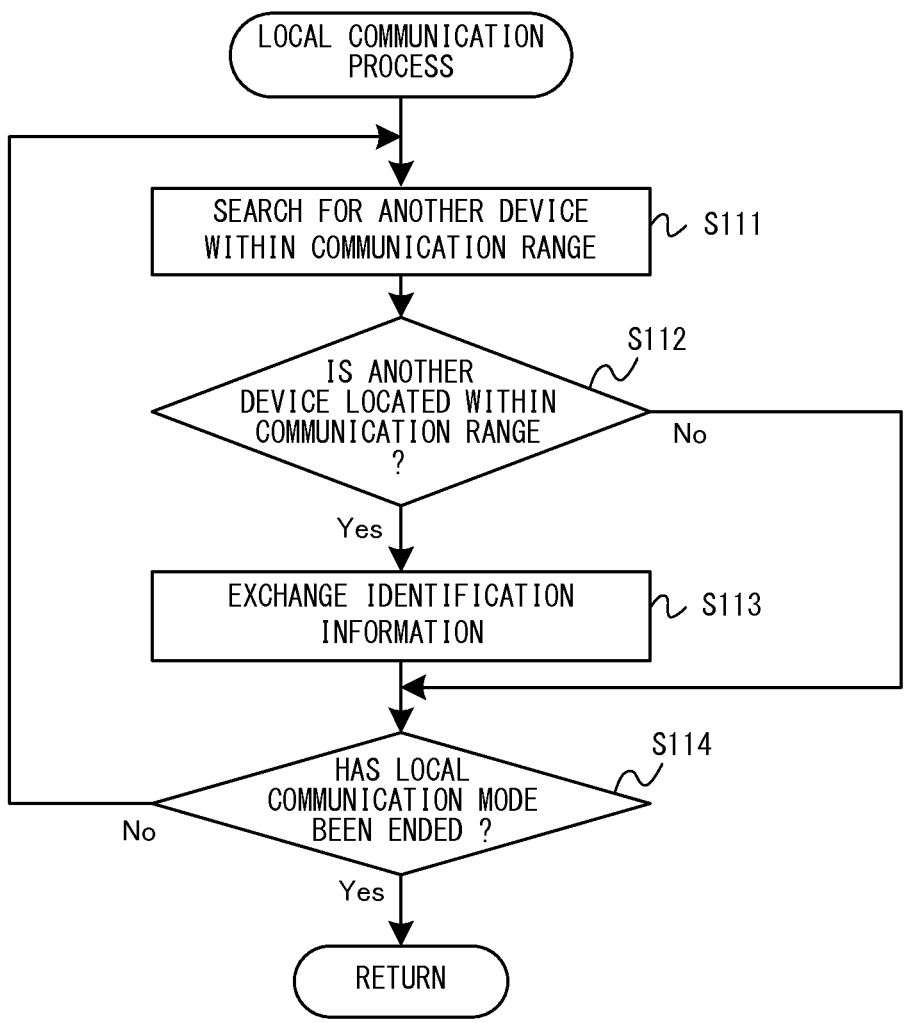
FIG. 11 is a flowchart showing an example non-limiting detailed flow of a local communication process (step S103) of FIG. 10.

FIG. 11 is a flowchart showing an example non-limiting detailed flow of the local communication process (step S103) of FIG. 10.

In step S111, the game device 10B searches for another device for communication. Specifically, the CPU 31 accesses the local communication unit 20 to receive radio waves from other devices and search for another game device 10 with which the game device 10B can perform local communication. Next, the game device 10B executes step S112.

In step S112, the game device 10B determines whether or not another device with which the game device 10B can perform local communication is present in the vicinity of the game device 10B. If another game device 10 with which the game device 10B can perform local communication is present in the vicinity of the game device 10B, then the game device 10B executes step S113. On the other hand, if no other game device 10 with which the game device 10B can perform local communication is present in the vicinity of the game device 10B, then the game device 10B executes step S114.

In step S113, the game device 10B and another game device 10 (here, the game device 10A) with which the game device 10B can perform local communication exchange their identification information. In step S113, the game device 10B obtains the identification information A from the game device 10A. The game device 10B also transmits the identification information B to the game device 10A. As a result, these game devices 10 exchange their stored identification information. The game device 10B stores the identification information A received from the game device 10A, as the obtained data 111, in the main memory 32. Next, the game device 10B executes step S114.

In step S114, the game device 10B determines whether or not the local communication mode has been ended. For example, when a predetermined operation button on the game device 10B is pressed, the local communication mode is ended. If the determination result is positive, the game device 10B ends the local communication process. On the other hand, if the determination result is negative, the game device 10B executes step S111 again.

Referring back to FIG. 10, next, the game device 10B displays the obtained information in step S104. For example, the game device 10B displays a list of identification information obtained from other devices which the game device 10B has passed, in response to the user B's operation. For example, when the user B selects the identification information A from the displayed identification information list, the game device 10B connects to the server 50 on the network. Specifically, when the user B selects the identification information A, the game device 10B accesses the web page A for the user A on the server 50 to obtain information from the web page A. Thus, the user B can browse information published on the web page A. Next, the game device 10B executes step S105.

In step S105, the game device 10B generates the data B based on an operation. Here, the user B generates the data B based on an operation which is performed using the operation unit 11 of the game device 10B. The generated data B may be, for example, data indicating a text message, or a character (e.g., a game character) generated by the user B. Next, the game device 10B executes step S106.

In step S106, the game device 10B determines whether or not to transmit the generated data B. For example, the game device 10B determines whether or not the user B has performed a predetermined operation for transmitting the data B to the game device 10A. If the determination result is positive, then the game device 10B executes step S107. On the other hand, if the determination result is negative, then the game device 10B executes step S108.

In step S107, the game device 10B transmits the generated data B to the server 50. Specifically, the game device 10B transmits to the server 50 a request to store the data B based on the identification information A obtained from the game device 10A. More specifically, the game device 10B transmits to the server 50 the identification information A which is information of the transmission destination, the identification information B which is information of the transmission source, and the data B. Specifically, the game device 10B accesses the web page A on the server 50 based on the identification information A to store the data B into the collection data box 65A in the web page A. Next, the game device 10B executes step S108.

In step S108, the game device 10B determines whether or not to obtain response data. Specifically, when the user B has performed a predetermined operation, the game device 10B determines to obtain response data. If the determination result is positive, then the game device 10B executes step S109. On the other hand, if the determination result is negative, the game device 10B ends the main process of FIG. 10.

In step S109, the game device 10B accesses the server 50 to obtain response data indicating the user A's response. Specifically, the game device 10B transmits a request to obtain response data, to the server 50, based on the identification information B. When response data transmitted by the user A is present in the web page B, the server 50 transmits to the game device 10B the response data stored in the response data box 66B in the web page B, in response to the request to obtain response data. For example, when the user B accesses the response data box 66B of the web page B on the server 50, a response of the user A (and responses of other users, if any) is displayed on the screen of the game device 10B. Thus, the game device 10B obtains the user A's response. Now the main process of FIG. 10 is ended.

Figure 12:
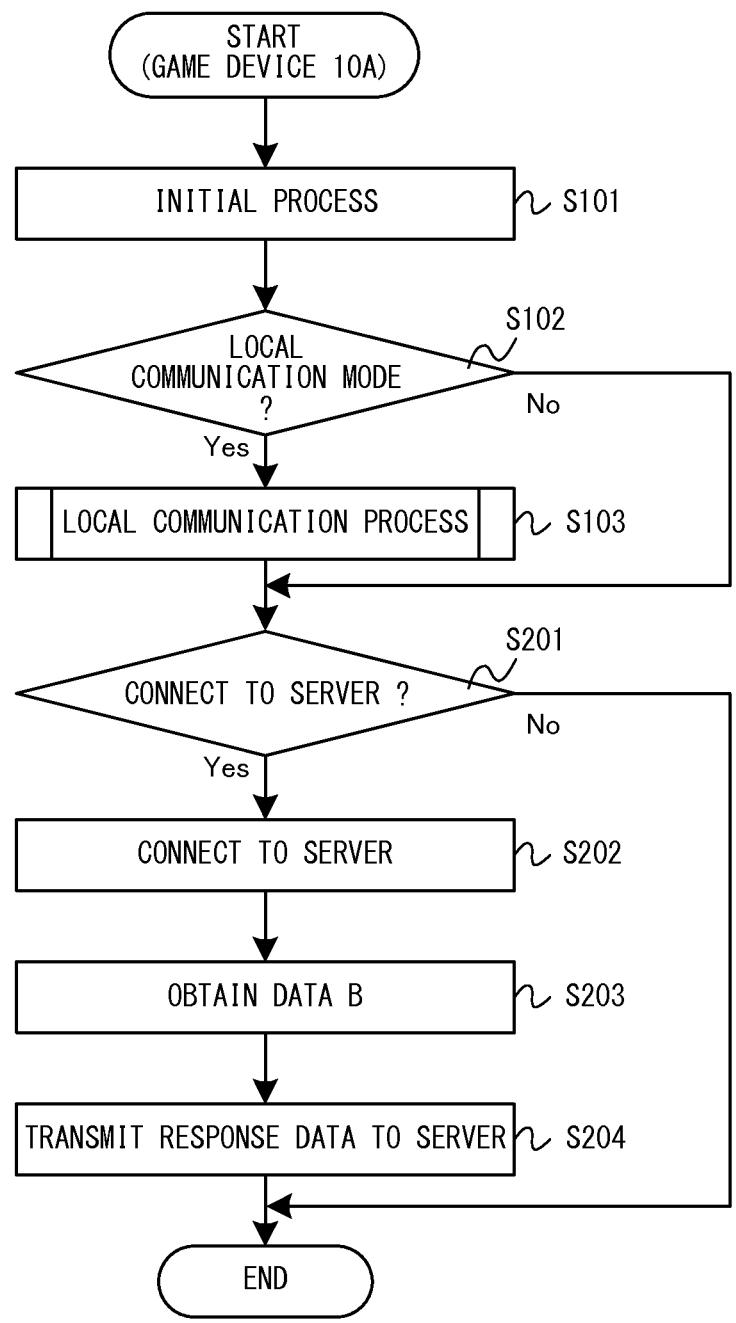
FIG. 12 is a flowchart showing an example non-limiting flow of a process executed by the game device 10A.

Next, a game process executed by the game device 10A will be described in detail with reference to FIG. 12. FIG. 12 is a flowchart showing an example non-limiting flow of the process executed by the game device 10A. Steps similar to those of FIG. 10 are indicated by the same reference characters and will not be described hereinafter. Note that the game device 10A can also execute the process of FIG. 10 and the game device 10B can also execute the process of FIG. 12.

Initially, in step S101, an initial process is executed in a manner similar to that described above so that the identification information A is stored in the game device 10A and the web page A is generated on the server 50. Next, steps S102 and S103 are executed. Thereafter, the game device 10B executes step S201.

In step S201, the game device 10A determines whether or not to connect itself to the server 50. Specifically, the game device 10A determines whether or not the user A has performed a predetermined operation for accessing the collection data box 65A of the web page A. For example, the game device 10A may display, on a screen thereof, an image for allowing the user to select or determine whether or not to refer to the collection data box 65A of the web page A. If the determination result is positive, then the game device 10A executes step S202. On the other hand, if the determination result is negative, the game device 10A ends the process of FIG. 12.

In step S202, the game device 10A connects to the server 50. Specifically, the game device 10A accesses the web page A on the server 50 based on the identification information A previously stored in the game device 10A. Next, the game device 10A executes step S203.

In step S203, the game device 10A obtains the data B from the server 50. Specifically, the game device 10A accesses the collection data box 65A in the web page A on the server 50. The collection data box 65A stores data generated by another user(s). The user A can view details of each piece of data (e.g., a message or an image) on the screen of the game device 10A. When the user A selects the data B generated by the user B, the game device 10A transmits a request to obtain the data B, to the server 50, thereby obtaining (downloading) the data B from the server 50. Next, the game device 10A executes step S204.

In step S204, the game device 10A transmits response data to the server 50. Specifically, the game device 10A designates a transmission destination (the identification information B) and transmits response data to the server 50. For example, when the user A generates response data by performing a predetermined operation (e.g., an operation of selecting the image 69b shown in FIG. 6), the game device 10A transmits to the server 50 a request to store the response data. The request to store the response data includes the response data and the identification information B. The game device 10A accesses the server 50 based on the identification information B to transmit the response data to the response data box 66B of the web page B. For example, in FIG. 6, a link to the web page B may be set in the image 69b displayed below the data B, and when the image 69b is selected, the response data may be transmitted to the web page B. Thus, the response data is transmitted to the web page B on the server 50. The user B can access the response data box 66B of his or her own web page B to refer to the response of the user A. Note that only the user B (the game device 10B) can access the response data box 66B, and other users cannot access thereto. Now the process of FIG. 12 is ended.

Next, the process executed by the server 50 will be described with reference to FIG. 13. FIG. 13 is a flowchart showing an example non-limiting flow of the process executed by the server 50. The process of FIG. 13 is executed by the CPU of the server 50 executing the server program 130. Note that steps S301 to S309 of FIG. 13 are repeatedly executed at predetermined time intervals.

Initially, in step S301, the server 50 generates a web page in response to a request from the game device 10. As described above, in the initial process of step S101, the game device 10 connects to the server 50, and generates a web page corresponding to itself on the server 50. For example, when the server 50 receives an instruction to generate a web page from the game device 10A, the server 50 generates the identification information A specific to the game device 10A. Each game device 10 has specific information (specific information stored in a ROM of the game device, or information specific to the user), and transmits the specific information along with the instruction to the server 50. For example, in the initial process, the game device 10A transmits the specific information thereof to the server 50. The server 50 generates the identification information A based on the specific information received from the game device 10A. There is a one-to-one correspondence between the identification information A and the specific information received from the game device 10A. The server 50 also generates the web page A corresponding to the game device 10A in addition to the identification information A. Specifically, the server 50 allocates the storage area 131 for the web page A, and generates the identification information A, the collection data box 65A, and the response data box 66B in the storage area. The server 50 also obtains predetermined information (e.g., a user's name and a user's attribution information) from the game device 10A, generates content data (e.g., an HTML file) including the predetermined information, and stores the content data into the storage area 131 for the web page A. As a result, the web page A (a web page dedicated to the user A) corresponding to the game device 10A is generated. The server 50 also transmits the generated identification information A to the game device 10A. The server 50 also generates the web page B in response to an instruction to generate the web page B from the game device 10B. Note that web pages generated on the server 50 may correspond to the game devices 10 on a one-to-one basis. Alternatively, when one game device 10 is shared by a plurality of users, a web page may be generated for each user. Next, the server 50 executes step S302.

In step S302, the server 50 determines whether or not the data B has been transmitted from the game device 10B. Here, the server 50 determines whether or not there has been the game device 10B's request to store the data B. If the determination result is positive (i.e., step S107 of FIG. 10 has been executed in the game device 10B), then the server 50 executes step S303. On the other hand, if the determination result is negative, then the server 50 executes step S304.

In step S303, the server 50 stores the data B received from the game device 10B. Specifically, the server 50 stores the data B transmitted by the game device 10B to the collection data box 65A of the web page A in association with information (the identification information A) about a transmission destination transmitted by the game device 10B.

FIG. 14 is a diagram showing a destination to which data transmitted to the server 50 is stored, and data which is stored. As shown in FIG. 14, the server 50 stores the identification information B and the data B to the collection data box 65A of the web page A. As described above, in step S107, the game device 10B transmits, to the server 50, information (the identification information A) about a transmission destination, information (the identification information B) about a transmission source, and the data B. The server 50 stores the data B in association with the information about the transmission source of the data B. The data C transmitted from the user C to the user A is stored along with the identification information C corresponding to the game device 10C into the collection data box 65A.

Referring back to FIG. 13, next, the server 50 executes step S304. In step S304, the server 50 determines whether or not there has been the game device 10A's request to obtain the data B. Step S304 corresponds to step S203 of the game device 10A. Here, the server 50 allows data stored in the collection data box 65 of each web page to be transmitted only to the game device 10 corresponding to that web page. For example, for the data B or the data C stored in the collection data box 65A, the server 50 accepts a request to obtain that data only from the game device 10A. In other words, data stored in the collection data box 65A of the web page A can be obtained only by the game device 10A (the user A). Note that the collection data box 65 of each web page may be accessible not only from the game device 10 corresponding to that web page but also from other game devices 10. In other words, data transmitted to one user from another user may be allowed to be viewed or obtained by the third party. If the determination result is positive, then the server 50 executes step S305. On the other hand, if the determination result is negative, then the server 50 executes step S306.

In step S305, server 50 transmits the data B to the game device 10A. Specifically, the server 50 obtains the data B from the collection data box 65A of the web page A, and transmits the data B to the game device 10A. Next, the server 50 executes step S306.

In step S306, the server 50 determines whether or not there has been the game device 10A's request to store response data. Step S306 corresponds to step S204 of the game device 10A. If the determination result is positive, then the server 50 executes step S307. On the other hand, if the determination result is negative, then the server 50 executes step S308.

In step S307, the server 50 stores response data. Specifically, the server 50 stores the identification information A corresponding to the game device 10A which has transmitted the request to store response data, and the response data, into the response data box 66B of the web page B (storage destination). In other words, the user A's response is stored to the response data box 66B of the web page B possessed by the user B. Next, the server 50 executes step S308.

In step S308, the server 50 determines whether or not there has been the game device 10B's request to obtain response data. Step S308 corresponds to step S109 of the game device 10B. Specifically, the server 50 determines whether or not there has been access from the game device 10B to the response data box 66B of the web page B. Here, it is assumed that the server 50 is allowed to transmit response data stored in the response data box 66 of each web page only to the game device 10 (user) corresponding to that web page. In other words, only the user B (the game device 10B) is allowed to access the response data box 66B of the web page B. As a result, the user B can view the user A's response, but no other users can view the user A's response. Note that the user A, who has transmitted a response, and the user C (third party) may be allowed to access the response data box 66B of the web page B. If the determination result is positive, then the server 50 executes step S309. On the other hand, if the determination result is negative, the server 50 ends the process of FIG. 13.

In step S309, the server 50 transmits the response data stored in the response data box 66B to the game device 10B. Now the server 50 ends the process of FIG. 13.

As described above, in this example embodiment, for example, when the users A and B pass each other, local communication is performed so that the game device 10A transmits the identification information A to the game device 10B. The game device 10B connects to the server 50 based on the identification information A to store the data B generated by itself into the collection data box 65A of the web page A on the server 50. Thereafter, the game device 10A connects to the server 50 to obtain the data B. The game device 10A also transmits response data to the response data box 66B of the web page B on the server 50. The game device 10B connects to the server 50 to obtain the response data. Thus, the users A and B, who have performed the StreetPass communication (data exchange), can subsequently communicate with each other via the server 50.

For example, when the users A and B pass each other, the game devices 10A and 10B perform the above local communication, whereby, for example, mail addresses may be automatically exchanged therebetween. For example, the game device 10B transmits a mail address to the game device 10A, and the user A transmits a message to the user B using the received mail address. Specifically, the message is transmitted from the user A to a mail server, which in turn transmits the received message to the user B. However, the mail address is private information, and therefore, a problem may occur with safety when private information is given to an unspecified user. In this embodiment, identification information (URL) for identifying a web page corresponding to a user, which is provided on the server 50, is exchanged, and therefore, the user is not identified, i.e., the above problem does not occur. Therefore, each user can communicate with other users who the user has passed, in safety.

In this example embodiment, users who have passed each other communicate with each other on the server. For example, messages or predetermined data transmitted from the user B to the user A are accumulated in the server 50. As a result, for example, one user can communicate with another user who that user has passed, in safety, compared to when the users directly exchange messages or data via mail or the like. Data from users are accumulated in the server 50, and therefore, one user can view data from another user who that user has passed, whenever that user wishes. One user who has received a message or data from another user can respond (send a message) to that user, and therefore, more intimate communication can be performed therebetween.

In this example embodiment, a web page dedicated each user is set, and each user can customize his or her own web page on his or her own. Therefore, for example, when the users A and B pass each other, the users A and B may be motivated to communicate with each other. Specifically, the user B can obtain the identification information A of the user A and browse a web page corresponding to the identification information A, thereby determining whether or not his or her interests and hobbies match those of the user A, for example. Therefore, the user B is motivated to communicate with the user A (the user B transmits a message or predetermined data to the web page A of the user A). Moreover, the user A can refer to data transmitted from the user B and browse the user B's web page to obtain the user B's information, whereby communication can be further developed.

In the example embodiment, the server stores information related to and specific to each user, and each user can browse information of other users. In order to access information of each user, identification information corresponding to that user (the game device 10 of that user) is required. When users pass each other, each of the users can obtain identification information of the other user, and based on the identification information, can obtain various kinds of information related to the other user. One user can select another user who that user wishes to communicate with, based on the obtained information, and can transmit predetermined data via the server to the selected user.

In this example embodiment, the collection data box 65 is not published for other users, and therefore, messages or data obtained from other users cannot be viewed by the third party. As a result, one user can perform deeper communication with another user who that user has passed. Specifically, because the collection data box 65 is not published for the third party, users who have passed each other can exchange information which should not be viewed by the third party, and therefore, deeper communication can be developed by exchanging such information.

Note that the above example embodiment is only for illustrative purposes. For example, configurations described below may be provided in other example embodiments.

For example, while the collection data box 65 and the response data box 66 can be referred to only by a user who possesses these boxes, and are not published for other users in the above example embodiment, these boxes may be published for other users in another example embodiment. Alternatively, the boxes may be published for designated users (other users designated by the user who possesses the boxes) including the user who possesses the boxes.

In the above example embodiment, the server 50 is a web server, and a web page is generated on the server for each user. In another example embodiment, the server 50 is not limited to a web server, and may be any server that provides an area (information publishing area) for publishing information specific to each user so that a plurality of the game devices 10 can communicate with each other. Specifically, any server may be employed that provides a predetermined content using characters or images, or audio, or the like so that a user can view or listen to when data in any other form (e.g., a text or binary form) is referred to by the game device 10 (or other devices). For example, specific data stored in the server may be obtained by the game device 10, which may in turn interpret the data using a specific application to display a predetermined content.

As used herein, the term "information publishing area" refers to a virtual area provided on a server. Predetermined data in the information publishing area on the server is read by a predetermined application of the game device 10, so that a content, such as a document or an image, can be viewed or listened to by the user. The information publishing area contains various contents, such as a document, an image, and audio, on the server which can be viewed or listened to by the user. When predetermined information is published in the information publishing area, every user can browse the information. The information publishing area may also contain link information for accessing other information. The information publishing area corresponding to a user (game device 10) contains information specific to the user, such as the user's information and the user's character. The information publishing area corresponding to a user also contains link information for accessing the data storage area dedicated to the user, such as the collection data box. Thus, each user can access information related to the user by referring to the information publishing area (e.g., a web page) corresponding to the user. Each information publishing area has identification information (URL) for accessing thereto. For example, the user A can access the user B's information publishing area based on the identification information of the user B's information publishing area. The user A can browse information related to the user B by accessing the user B's information publishing area.

In the above example embodiment, it is assumed that one game device 10 is used by each specific user. In another example embodiment, one game device 10 may be used by a plurality of users or one user may use a plurality of game devices 10. In this case, the web page is generated for each user. For example, when the user A uses the game device 10A, the user A inputs a user ID specific to himself or herself. The game device 10A stores the user ID, and a web page corresponding to the user ID is generated on the server 50. On the other hand, when the user B uses the game device 10A, the user B inputs his or her own user ID, and a web page corresponding to the user ID is generated on the server 50. Thereafter, for example, when the user A passes another user after having logged in the game device 10A (while using the game device 10A), the user A obtains identification information from that user (another game device 10) to communicate with that user. The user A can also log in the game device 10B using his or her own user ID and use the game device 10B to communicate with another user who the user A has passed.

In the above example embodiment, a plurality of web pages are generated on the server 50. In another example embodiment, not all web pages may be provided on a single server. Specifically, the function of the server 50 may be implemented using a plurality of servers. For example, the web page A corresponding to the user A may be generated on one server while the web page B corresponding to the user B may be generated on another server. Alternatively, for example, the collection data box 65 in the web page may be provided on another server.

In the above example embodiment, the collection data box 65 and the response data box 66 are provided in a web page corresponding to each user. For example, when the user B stores data to the collection data box 65A of the web page A, response data indicating a response to the user B is stored to the response data box 66B of the web page B. In another example embodiment, a response may not be stored to a web page of another user (the user B). For example, one user's (the user A's) response to another user (the user B) may be stored to his or her own (the user A's) web page. Even in this case, the user B can browse the user A's response by referring to the user A's web page. Note that, in this case, the web page B of the user B may not be previously provided on the server 50, and if the web page A of the user A is provided, the users A and B can communicate with each other on the web page A.

(Second Example Embodiment)

Next, a second example embodiment will be described. In the second example embodiment, similar to the first example embodiment, a process is executed between a plurality of game devices 10 and a server 50. Also, in the second example embodiment, similar to the first example embodiment, a web page is generated on the server 50 for each game device 10. For example, when a game device 10A and a game device 10B pass each other, the game devices 10A and 10B perform local communication. In the second example embodiment, when the game devices 10A and 10B pass each other, the game device 10A (the user A) transmits the details of a request to the game device 10B (the user B).

Figure 15:
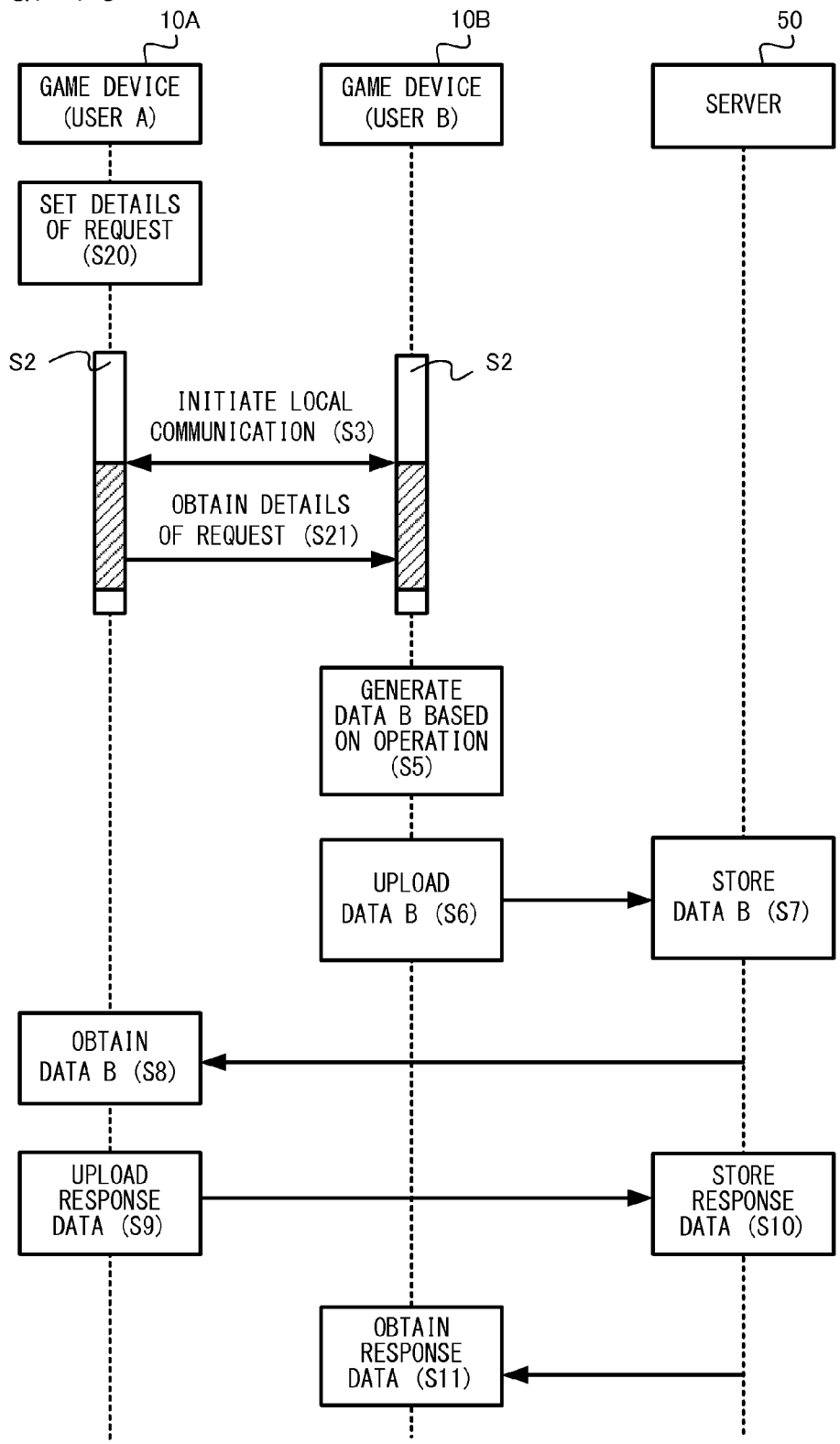
FIG. 15 is a diagram schematically showing an example non-limiting process according to a second example embodiment which is executed in a game system including the game devices 10A and 10B and the server 50.

FIG. 15 is a diagram schematically showing the process of the second example embodiment executed in the game system including the game devices 10A and 10B and the server 50. Note that steps similar to those of FIG. 4 are indicated by the same reference characters and will not be described in detail hereinafter.

As shown in FIG. 15, initially, in the game device 10A, the user A sets the details of a request (step S20). Here, the user A inputs the details of a request to an unspecified other user using the screen of the game device 10A. The details of a request are not limited if the request is what the user A asks another user for.

Figure 16:
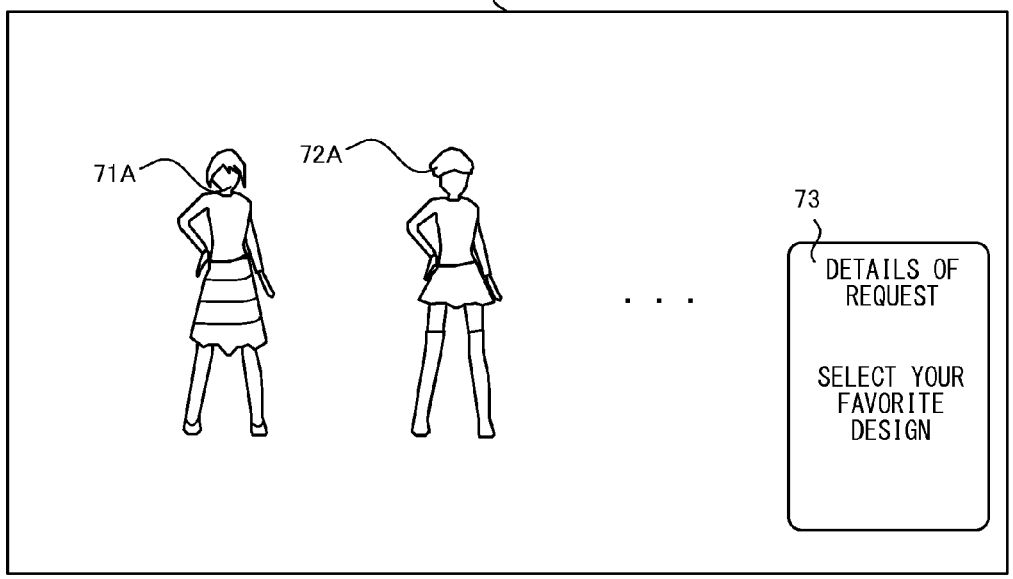
FIG. 16 is a diagram showing example non-limiting details of a request set by the user A.

FIG. 16 is a diagram showing example non-limiting details of a request set by the user A. As shown in FIG. 16, for example, the user A sets the details of a request in order to collect comments of an unspecified other user about a plurality of characters 71A, 72A, and the like created by the user A. The user A inputs the details of a request (e.g., "Select your favorite design") to a display region 73 using the operation unit 11. The user A, when setting the details of the request, sets the characters 71A and 72A which are to be transmitted to another user (another game device 10). For example, a list of characters is displayed on the screen, and the user A selects, from the list, characters which are to be transmitted, thereby setting the characters which are to be transmitted to an unspecified other game device 10 in addition to the details of the request.

Figure 17:
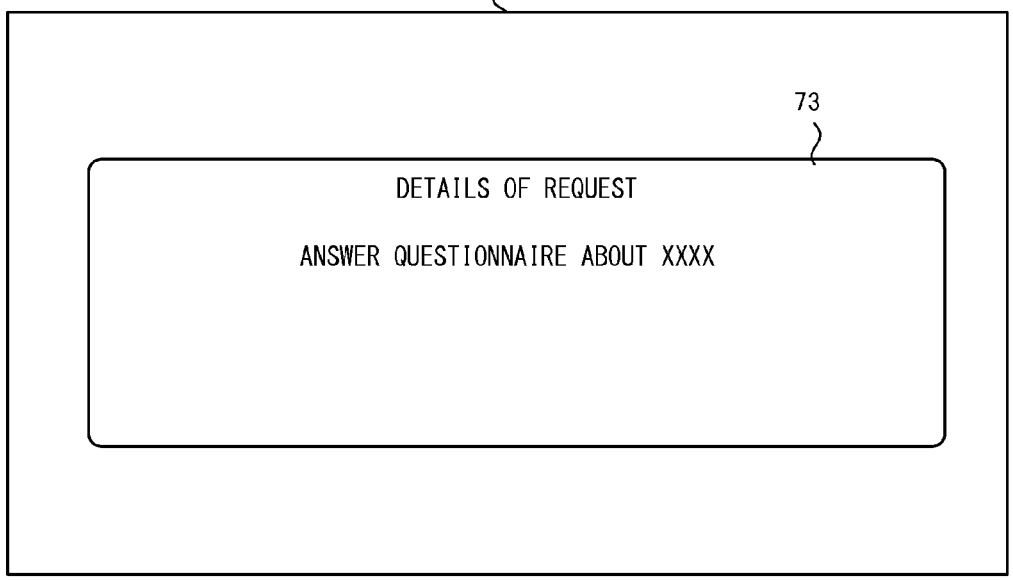
FIG. 17 is a diagram showing another example non-limiting details of a request set by the user A.

FIG. 17 is a diagram showing another example non-limiting details of a request set by the user A. As shown in FIG. 17, for example, the user A sets the details of a request in order to ask another user to answer a questionnaire. For example, the request may be accompanied by the details of the questionnaire (the details of a question(s)) along with a message for asking for an answer to the questionnaire. Here, as shown in FIG. 16, the request may or may not be accompanied by predetermined characters. For example, when the details of a request are accompanied by the predetermined characters, a request to answer the questionnaire related to the accompanying characters may be set as the details of the request.

Thus, in step S20, the user A inputs the details of an arbitrary request, which are in turn stored to the game device 10A.

Next, in step S2, in the game devices 10A and 10B, local communication is enabled or turned on. Thereafter, when the game devices 10A and 10B are located within a predetermined distance from each other, local communication is initiated (step S3).

After the initiation of local communication, the game device 10B obtains the details of a request from the game device 10A (step S21). Here, the game device 10B may obtain predetermined characters in addition to the details of the request, such as those shown in FIG. 16. Thus, the game device 10B obtains the details of the request and the characters targeted by the details of the request. Note that the game device 10B also obtains information (the identification information A) related to the transmission source.

Next, the user B enters an input to the game device 10B based on the details of the request obtained from the game device 10A, so that the game device 10B generates data B based on the input (step S5). For example, when the request is to select the characters shown in FIG. 16, the user B selects a character having his or her favorite design from the characters displayed on the screen of the game device 10B, so that the data B is generated based on the user B's selection. Alternatively, in the case of the request of FIG. 17, the user B inputs an answer to the details of the request using the operation unit 11, and the game device 10B generates the data B based on the input.

Next, the game device 10B uploads the generated data B to the server 50 (step S6), and the server 50 stores the data B (step S7).

Next, the game device 10A obtains the data B from the server 50 (step S8). Thereafter, the game device 10A uploads response data to the server 50 (step S9), and the game device 10B obtains the response data (step S11).

Thus, in the second example embodiment, the user A sets the details of a request in the game device 10A (step S20), and the game device 10A transmits the details of the request to the game device 10B (step S21). Here, the game device 10B obtains an object(s) (e.g., the characters 71A and 72A) targeted by the details of the request in addition to the details of the request. The game device 10B generates the data B by the user B entering an input based on the obtained details of the request (step S5), and the data B is obtained by the user A via the server 50 (step S8). Thus, the users A and B communicate with each other.

(Details of Game Process of Second Example Embodiment)

Next, the game process of the second example embodiment executed in this game system will be described in detail. A case where a predetermined request is transmitted from the game device 10A to the game device 10B will be described hereinafter. FIG. 18 is a diagram showing example non-limiting kinds of data stored in the game device 10A.

As shown in FIG. 18, the main memory 32 of the game device 10A stores request data 110. The request data 110 indicates the details of a request set in the game device 10A. The request data 110 is transmitted to the game device 10B, and is stored to the main memory 32 of the game device 10B. In the case of a request such as that shown in FIG. 16, the request data 110 may contain data of a plurality of characters.

Note that other kinds of data stored in the main memory 32 of the game device 10A, kinds of data stored in the game device 10B, and kinds of data stored in the server 50 are similar to those of the first example embodiment and will not be described.

Figure 19:
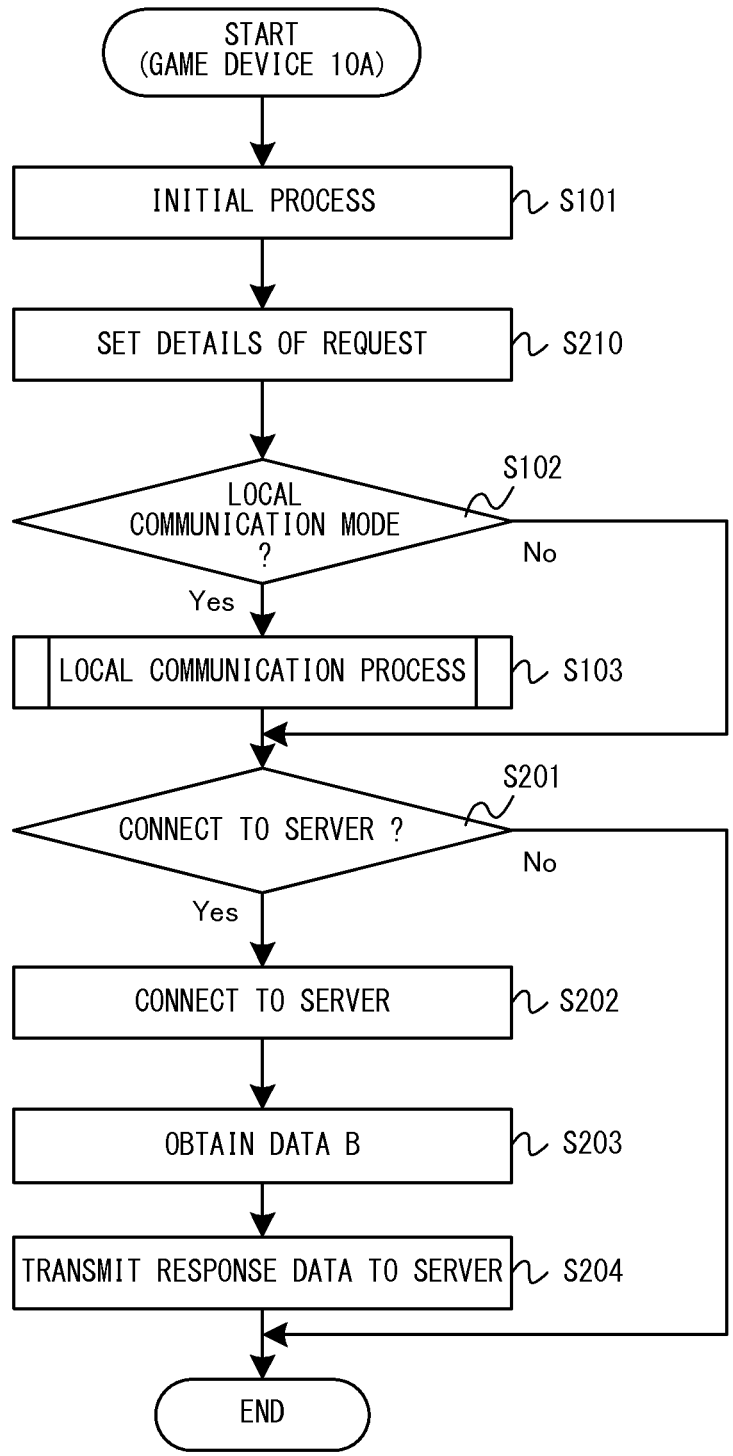
FIG. 19 is a flowchart showing an example non-limiting flow of a process executed by the game device 10A in the second example embodiment.

FIG. 19 is a flowchart showing an example non-limiting flow of a process executed by the game device 10A in the second example embodiment. Note that, in FIG. 19, steps similar to those of FIG. 12 are indicated by the same reference characters and will not be described. Also, a process executed in the game device 10B is similar to that of the first example embodiment (see FIG. 10) and will not be described. Also, a process executed in the server 50 is similar to that of the first example embodiment (FIG. 13) and will not be described.

Initially, in step S101, an initial process is executed in a manner similar to that described above. Next, the game device 10A executes step S210.

In step S210, the game device 10A sets the details of a request. Specifically, the game device 10A generates request data 110 based on the user A's input. Here, the generated request data 110 is data indicating the details of a request to an unspecified other user which have been input by the user A. For example, as shown in FIG. 16, the request data 110 includes, as the details of the request, a message for causing another user to select a character. The request data 110 also includes data of a plurality of characters. Thereafter, the game device 10A stores, in the main memory 32, the identification information A possessed by itself and the request data indicating the details of the request thus set. Next, the game device 10A executes steps S102 and S103.

Note that, in the local communication process of step S103, the game device 10A transmits the request data 110 along with the identification information A to the game device 10B. As a result, the game device 10B obtains the identification information A and the request data 110 from the game device 10A. The game device 10B executes step S104 of FIG. 10 to display the details of the request indicated by the request data 110.

Next, the game device 10A executes steps S201 to S204, and ends the process of FIG. 19.

As described above, in the second example embodiment, the game device 10A generates the request data 110 indicating the user's request. When the users A and B pass each other, local communication is performed so that the game device 10A transmits the identification information A and the request data 110 to the game device 10B. An operation is performed based on the request data on the game device 10B to generate data B. The game device 10B connects to the server 50 based on the identification information A to store the data B generated by itself to the collection data box 65A of the web page A on the server 50. Thereafter, the game device 10A connects to the server 50 to obtain the data B. The game device 10A also transmits response data to the response data box 66B of the web page B on the server 50. The game device 10B connects to the server 50 to obtain the response data. Thus, the users A and B, who have passed each other, can communicate with each other via the server 50.

As described above, in the second example embodiment, the users A and B start communicating with each other after the users A and B have passed each other. For example, when the users A and B passed each other, the details of the request set by the user A are transmitted along with an object targeted by the details of the request to the user B. For example, when the user A intends to communicate with the user B (unspecified user), who the user A has passed, the user A may transmit a message (a string of letters etc.) to the user B. In this case, the user A may unilaterally transmit a message to the user B, and the user B may only receive the message. Therefore, two-way communication is not likely to occur.

On the other hand, in the second example embodiment, the details of a request set by one user are transmitted to an unspecified other user. In this case, objects (characters) targeted by the details of a request are transmitted along with the details of the request (a request to select a character) to the unspecified other user. Because one user transmits the details of a request to an unspecified other user, two-way communication is more likely to occur than when one user transmits only a message to an unspecified other user. Note that the object targeted by the details of a request is not limited to a user's character, and may be any object. For example, the object targeted by the details of a request may be any other contents, such as an image and an item. The details of a request related to a content are set and transmitted to another user, and therefore, that user (unspecified user) may be motivated to communicate with a user who has transmitted the request.

In the second example embodiment, similar to the first example embodiment, communication is performed on the server 50. Therefore, the above advantages are obtained, and one user can safely and smoothly communicate with another user who that user has passed.

In the second example embodiment, one user may transmit his or her desired request to unspecified other users who that user has passed, and therefore, may obtain various answers to the request from the unspecified other users.

In the second example embodiment, the details of a request set by the user A are transmitted to the user B (unspecified user), and the user B views the details of the request, and generates the data B indicating an answer to the details of the request. In this case, the user B can refer to the web page A of the user A on the server based on the identification information A obtained from the game device 10A. The user B can refer to the web page A of the user A, who the user B has passed, and therefore, the user B may be motivated to answer the details of a request from the user A (generate and transmit the data B to the user A), compared to when the user B only obtains the details of the request from the user A. In other words, when one user only obtains the details of a request from another user who that user has passed, subsequent communication is not likely to develop. However, in this example embodiment, the user B can refer to the web page A which is generated by the user A on his or her own, and therefore, can view various pieces of information related to the user A, i.e., can obtain information for communicating with the user A.

Note that, in the second example embodiment, an answer (the data B) to the details of a request may not be stored in the server. For example, a delivery server may transmit an answer to the details of a request from the game device 10B to the game device 10A. For example, each game device can wirelessly communicate with the delivery server. The delivery server previously stores identification information corresponding to each game device. When the users A and B pass each other, the game device 10A transmits the identification information A and the details of a request to the game device 10B via local communication. The game device 10B, which has obtained the identification information A, transmits an answer to the details of the request to the delivery server based on the identification information A. The delivery server transfers the received answer to the game device 10A based on the identification information A, so that the game device 10A obtains the transferred answer. The game device 10A may also transmit a response (the response data) to the answer via the delivery server to the game device 10B. As a result, one user can communicate with another user who that user has passed, after the users have passed each other.

(Third Example Embodiment)

Figure 20:
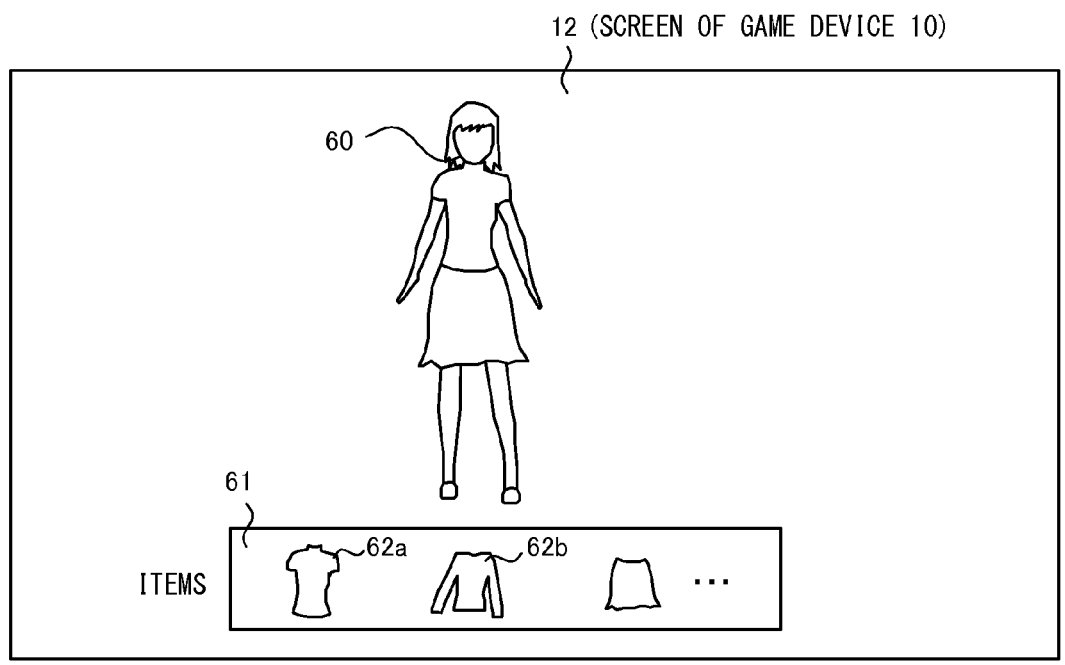
FIG. 20 is a diagram showing an example non-limiting image which is displayed on a display unit 12 when the game device 10 executes a game according to a third example embodiment.

Next, a third example embodiment will be described. Firstly, a game performed in a game device 10 of the third example embodiment will be described. FIG. 20 is a diagram showing an example non-limiting image which is displayed on a display unit 12 when the game device 10 executes the game of the third example embodiment.

The game of this example embodiment is a game in which a user acts the role of the owner of a clothing shop and serves customers. For example, as shown in FIG. 20, when a customer character (a character controlled by the game device 10) 60 enters the store, the user of the game device 10 serves the customer character 60. Specifically, the user selects an item(s) which suits the customer character 60 from a plurality of items (66a, 66b, and the like) displayed in a display region 65 based on the customer character 60's request, to coordinate the customer character 60's clothing. The customer character 60 whose clothing has been coordinated determines whether or not to buy the item based on the result of the coordination.

Note that each game device 10 stores its user's character. The game device 10A stores a character A which is operated by the user A, the game device 10B stores a character B which is operated by the user B, and the game device 10C stores a character C which is operated by the user C. For example, the user A operates the character A to serve the customer character 60, thereby running his or her own shop in the game device 10A.

The user of each game device 10 has a virtual shop on the server 50. Specifically, the user A is the owner of a shop A, the user B is the owner of a shop B, and the user C is the owner of a shop C. The virtual shops on the server 50 are specifically web pages. Each user can customize his or her own virtual shop on the server 50. Each virtual shop has various kinds of information related to the user thereof (information about the user's character, the user's name, the user's preference, and the like). Each user can access other users' virtual shops in addition to his or her own virtual shop. For example, the user A runs his or her own shop A and customizes goods, a layout, and the like of the shop A. Other users can visit the shop A, browse information related to the user A, and buy items sold in the shop A.

Figure 21:
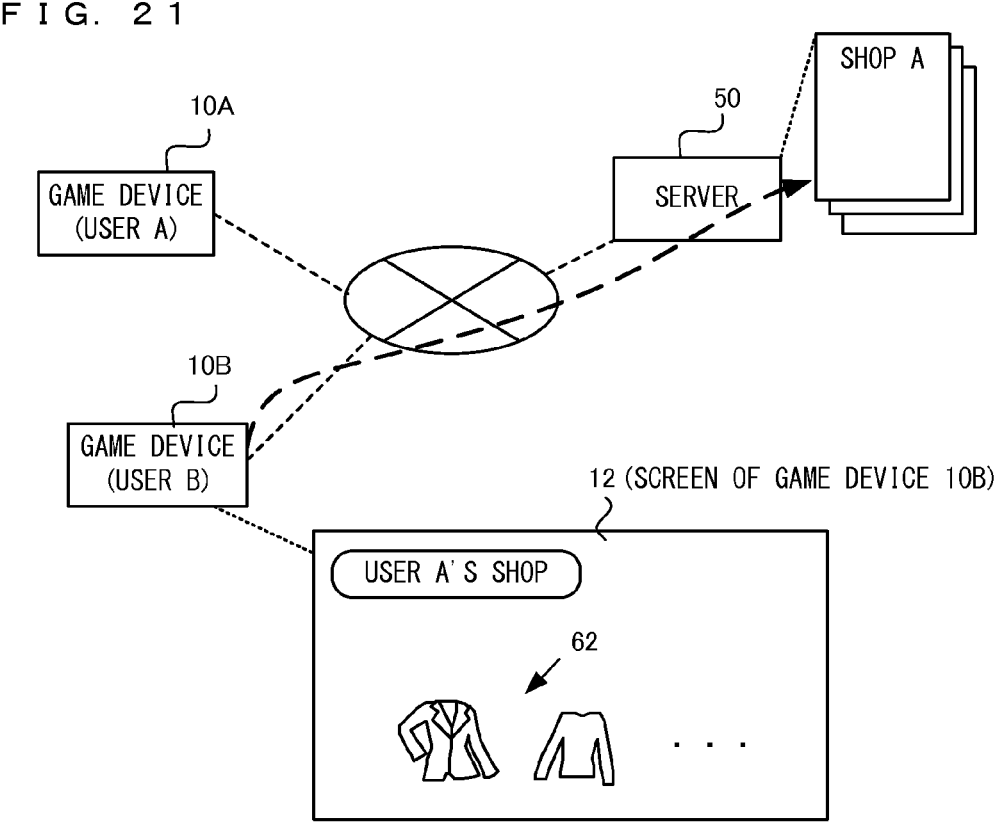
FIG. 21 is a diagram showing how the game device 10B accesses a shop A of the user A on the server 50.

FIG. 21 is a diagram showing how the game device 10B accesses the shop A of the user A on the server 50. As shown in FIG. 21, when the user B of the game device 10B accesses the server 50 to access the shop A of the user A, a plurality of items 62 of the user A are displayed on the display unit 12 of the game device 10B, for example. The user B can access the shop A of the user A to browse or buy the goods (the items 62) of the shop A. In the shop A, a page which introduces the character A of the user A may be provided, the character A may be displayed, and information specific to the character A may be displayed.

In the third example embodiment, similar to the first and second example embodiments, a process is executed between a plurality of the game devices 10 and the server 50. Also in the third example embodiment, similar to the first and second example embodiments, local communication is performed between the game devices 10 which are located within a predetermined distance from each other. In the third example embodiment, for example, when the game devices 10A and 10B pass each other, the game device 10A transmits the character A to the game device 10B, and the game device 10B coordinates the character A's clothing.

Figure 22:
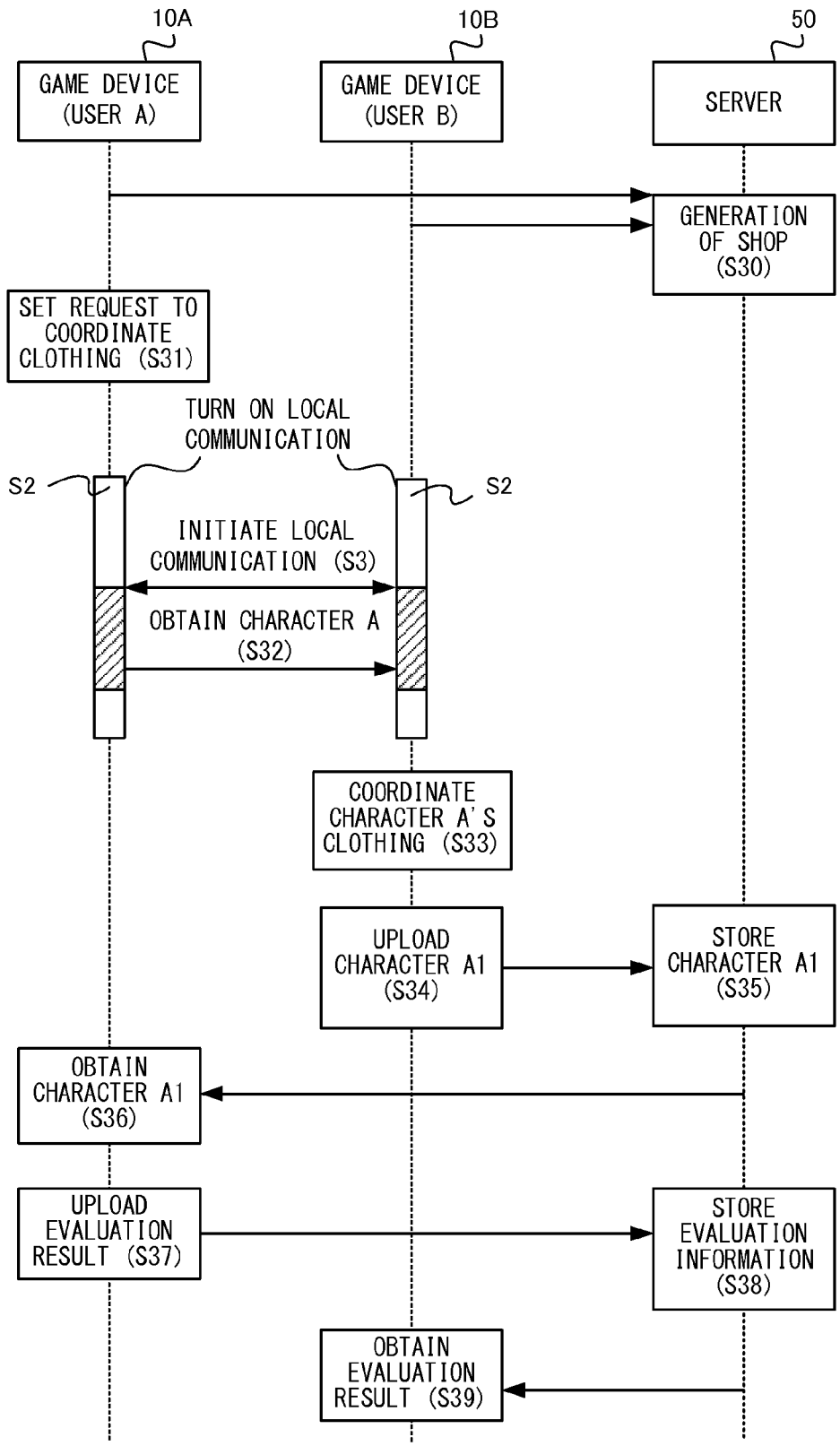
FIG. 22 is a diagram schematically showing an example non-limiting game process of the third example embodiment which is performed in the game system including the game devices 10A and 10B and the server 50.

FIG. 22 is a diagram schematically showing the game process of the third example embodiment which is performed in a game system including the game devices 10A and 10B and the server 50. The game process of the third example embodiment will be briefly described hereinafter with reference to FIG. 22. Note that, in FIG. 22, steps similar to those of the first example embodiment are indicated by the same reference characters and will not be described in detail.

As shown in FIG. 22, initially, each shop (web page) is generated in the server 50 (step S30). Specifically, each game device 10 transmits an instruction to generate a shop to the server 50, and the server 50 generates the shop.

Next, the game device 10A sets a coordination request (step S31). For example, the user A starts the game in the game device 10A, and sets a request which asks an unspecified user to coordinate the character A's clothing. The character A is stored in the game device 10A and corresponds to the user A.

Figure 23:
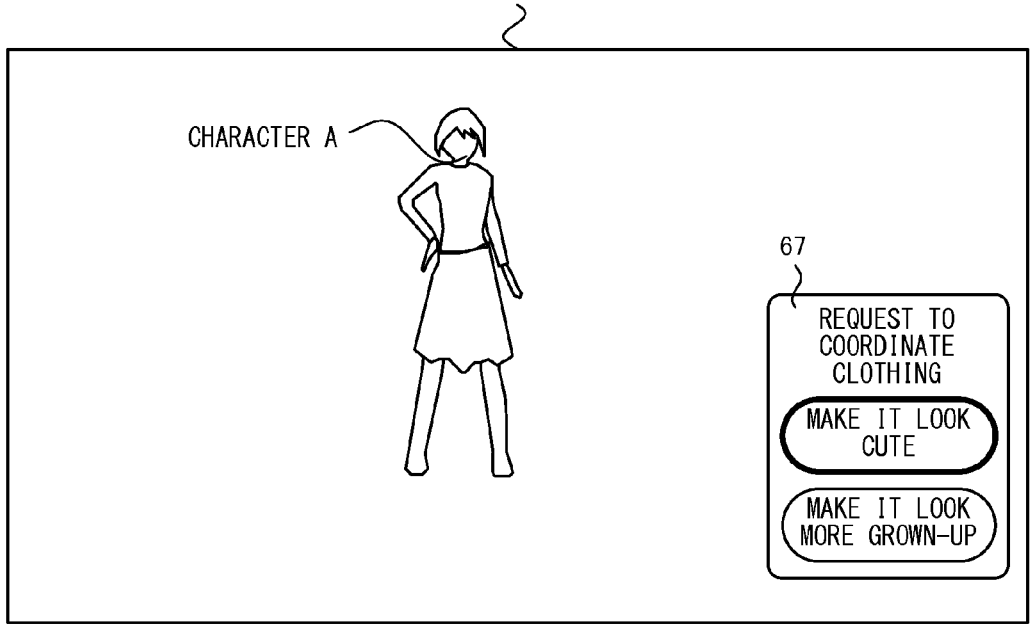
FIG. 23 is a diagram showing an example non-limiting image displayed on the screen of the game device 10A when a coordination request is set.

FIG. 23 is a diagram showing an example non-limiting image displayed on the screen of the game device 10A when the coordination request is set. FIG. 23 shows the character A which is operated by the user A in the game device 10A. An image 67 for setting the coordination request is also displayed on the screen. For example, when the user A selects the image 67, options (the details of the request) for determining what kind of clothing coordination is desired for the character A are displayed. For example, as shown in FIG. 23, an image showing written words "Make it look cute" and an image showing written words "Make it look more grown-up" are displayed. For example, when the user A selects the image showing "Make it look cute," a coordination request and the details of the request (a request to coordinate clothing so that the character looks cute) are set.

Next, local communication is enabled or turned on in the game devices 10A and 10B (step S2). When a distance between the game devices 10A and 10B becomes a predetermined value or less, local communication is initiated between the game devices 10A and 10B (step S3).

After the initiation of local communication, in step S32 the game device 10B obtains from the game device 10A data of the character A, data indicating the details of a request, and information for accessing the shop A (shop-A-information (e.g., the URL of the shop A)), which are stored in the game device 10A. Also in step S32, the game device 10A obtains from the game device 10B information for accessing the shop B (shop-B-information (e.g., the URL of the shop B)). As a result, the game devices 10A and 10B exchange data. Thereafter, when the game devices 10A and 10B are separated from each other by a distance, local communication cannot be performed between the game devices 10A and 10B. Note that when a request to coordinate the character B's clothing is set in the game device 10B, the game device 10A may obtain from the game device 10B data indicating the character B and data indicating the details of the request in addition to the shop-B-information.

Next, in step S33, the user B starts playing the game in the game device 10B, and coordinates the obtained character A's clothing.

Figure 24:
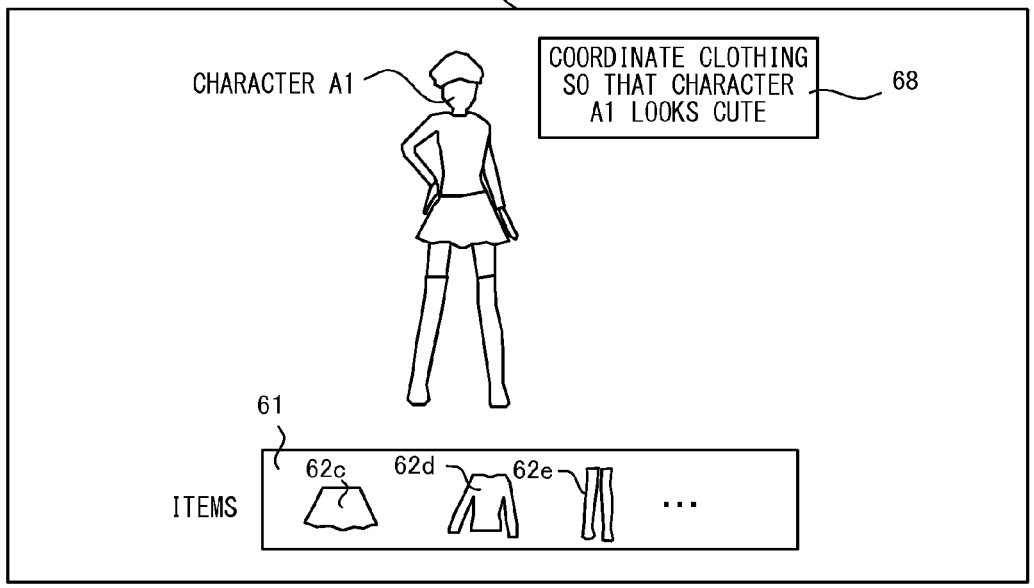
FIG. 24 is a diagram how the clothing of a character A obtained from the game device 10A is coordinated in the game device 10B.

FIG. 24 is a diagram how the clothing of the character A obtained from the game device 10A is coordinated in the game device 10B. For example, as shown in FIG. 24, the character A obtained from the game device 10A and an image (an image containing a string of letters "Coordinate clothing so that the character looks cute") 68 showing the details of the request set by the user A, are displayed on the screen of the game device 10B. The user B selects an item(s) which suits the character A from a plurality of items (62c, 62d, and the like) displayed in an item display region 61, thereby coordinating the character A's clothing. For example, the user B selects an item using a touch panel which is provided on the screen of the display unit 12 to serve as the operation unit 11. As a result, the character A wearing the selected item is displayed on the screen. The user B coordinates the character A's clothing with his or her sense, based on the details of the request displayed in the image 68. The character A whose clothing has been coordinated by the user B is stored as a character A1 in the game device 10B.

Next, when the user B ends coordination of the character A's clothing, the character A (the character A1) whose clothing has been coordinated is uploaded to the server 50 (step S34). The server 50 stores the uploaded character A1 to itself or an external storage device (step S35).

Next, the user A starts playing the game in the game device 10A, and accesses the server 50 to obtain the character A1 stored in the server 50 (step S36). Next, the user A views and evaluates the obtained character A1 on the display unit 12 of the game device 10A, and uploads evaluation information to the server 50 (step S37). The server 50 stores the evaluation information transmitted from the game device 10A (step S38). Thereafter, the game device 10B accesses the server 50 to obtain the user A's evaluation from the server 50 (step S39).

Figure 25:
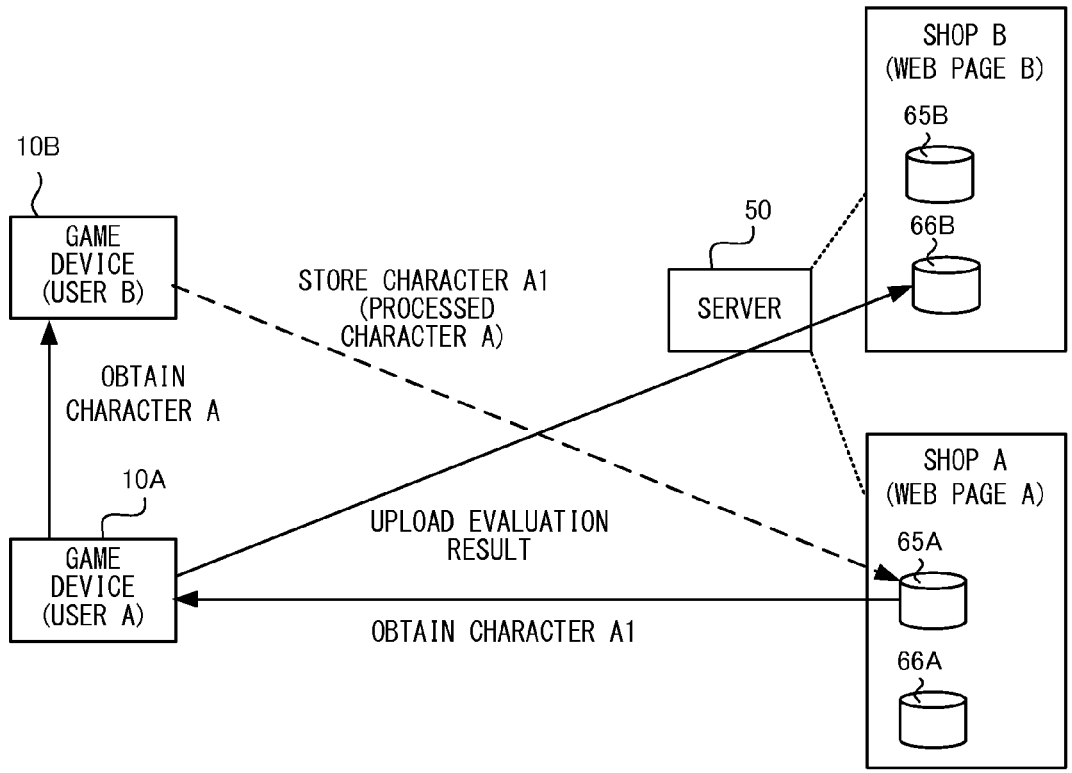
FIG. 25 is a diagram showing an example non-limiting flow of data between each device of the third example embodiment.

A flow of the above game will be described with reference to FIGS. 25 and 26. FIG. 25 is a diagram showing an example non-limiting flow of data between each device of the third example embodiment. As shown in FIG. 25, the game device 10B obtains the character A from the game device 10A, and processes the character A to generate the character A1. The game device 10B stores the generated character A1 to the collection data box 65A in the shop A on the server 50. Next, the game device 10A accesses the collection data box 65A in the shop A to obtain the character A1.

Figure 26:
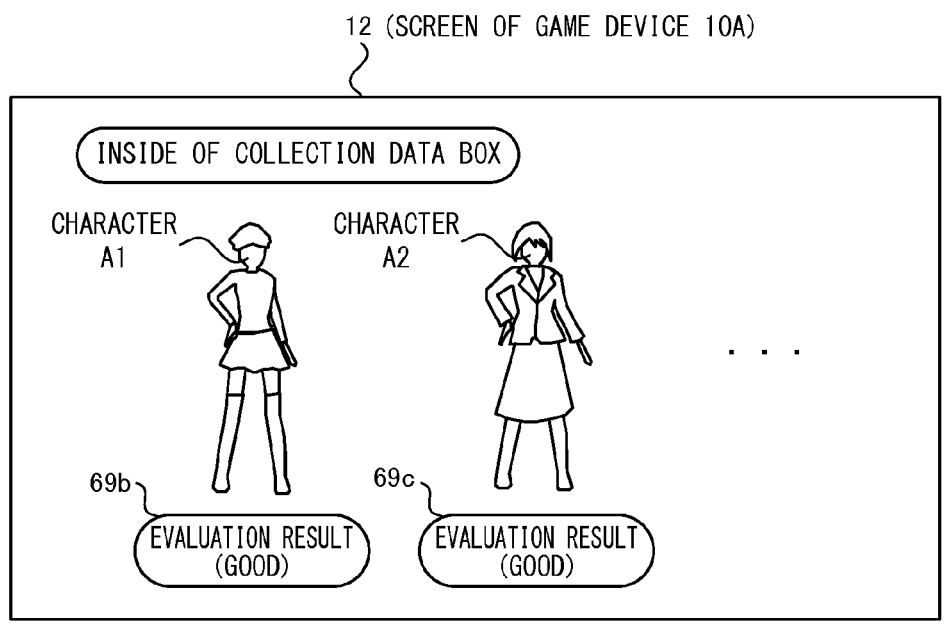
FIG. 26 is a diagram showing an example non-limiting image which is displayed on the screen of the game device 10A when the user A accesses the collection data box 65A in the shop A on the server 50.

FIG. 26 is a diagram showing an example non-limiting image which is displayed on the screen of the game device 10A when the user A accesses the collection data box 65A in the shop A on the server 50. The collection data box 65 is a storage area for storing (accumulating) characters whose clothing has been coordinated, and is provided for each shop. Note that each user can view data in his or her own collection data box 65 and cannot view data in other users' collection data boxes 65.

As shown in FIG. 26, the collection data box 65A in the shop A stores the uploaded character A1 whose clothing has been coordinated by the user B, the uploaded character A2 whose clothing has been coordinated by the user C, and the like. In other words, the collection data box 65A in the shop A stores the characters A whose clothing has been coordinated by other users who the user A have passed. For example, the user A can select the character A1 to download the character A1 to the game device 10A. The user A can also evaluate each of the characters A whose clothing has been coordinated. For example, as shown in FIG. 26, an image 69 indicating that the character A whose clothing has been coordinated is highly valued is displayed below the character A. When the user A selects the image 69, the evaluation result is transmitted. Specifically, when the user A selects the image 69b below the character A1, the evaluation result for the character A1 is uploaded from the game device 10A to the shop B on the server 50 (see FIG. 25). Specifically, the evaluation result is stored to the response data box 66B of the shop B. Thereafter, the user B can access the response data box 66B in the shop B using the game device 10B to view the user A's evaluation of the character A whose clothing has been coordinated by himself or herself.

Thus, the user A sets a request to coordinate the character A in the game device 10A (step S31), and local communication is performed when the user A (the game device 10A) and the user B (the game device 10B) pass each other (step S3). The local communication allows the game device 10B to obtain the character A from the game device 10A (step S32). In the game device 10B, the obtained character A's clothing is coordinated based on the user B's operation (step S33), and the character A (the character A1) whose clothing has been coordinated is uploaded to the server 50 (step S34). Next, the user A obtains the character A1 generated by the user B from the server 50 (step S36), and uploads the evaluation result to the server 50 (step S37). Thereafter, the user B obtains the evaluation result from the server 50 using the game device 10B (step S39).

(Details of Game Process of Third Example Embodiment)

Figure 27:
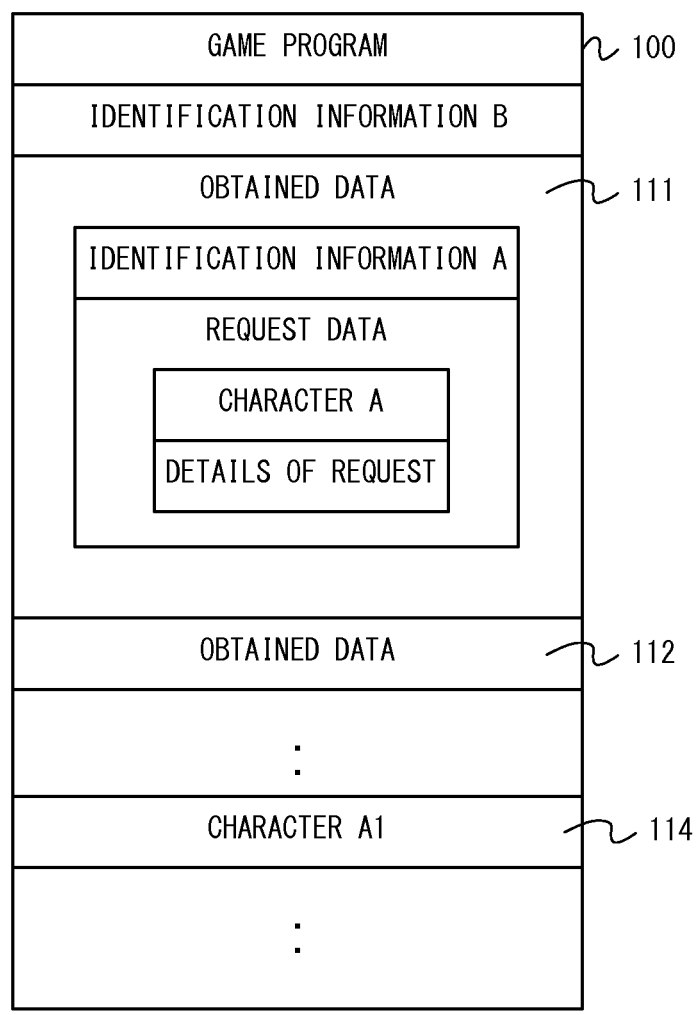
FIG. 27 is a diagram showing various example non-limiting kinds of data stored in the game device 10B.

Next, the game process executed in this game system will be described in detail. A case where the clothing of the character A obtained from the game device 10A is coordinated in the game device 10B will be described hereinafter. Firstly, various kinds of data used in the game process will be described. FIG. 27 is a diagram showing various example non-limiting kinds of data stored in the game device 10B. As shown in FIG. 27, the data 111 which the game device 10B has obtained from the game device 10A includes the identification information A (shop-A-information) and request data. The request data includes data of the character A and data indicating the details of a request. The main memory 32 stores data 114 of the character A1 (character-A1-data 114). Note that the main memory 32 stores the identification information B (shop-B-information) and the data 112 obtained from another game device 10.

The data of the character A included in the request data indicates the character A which has been obtained from the game device 10A via local communication. The data indicating the details of a request which is included in the request data indicates the details (e.g., "Coordinate clothing so that the character looks cute") of the request which have been set by the user A.

The character-A1-data 114 is data of the character A whose clothing has been coordinated by the user B. Specifically, the character-A1-data 114 is data of the character A obtained from the game device 10A whose clothing has been coordinated, i.e., to which an item(s) have been added.

Figure 28:
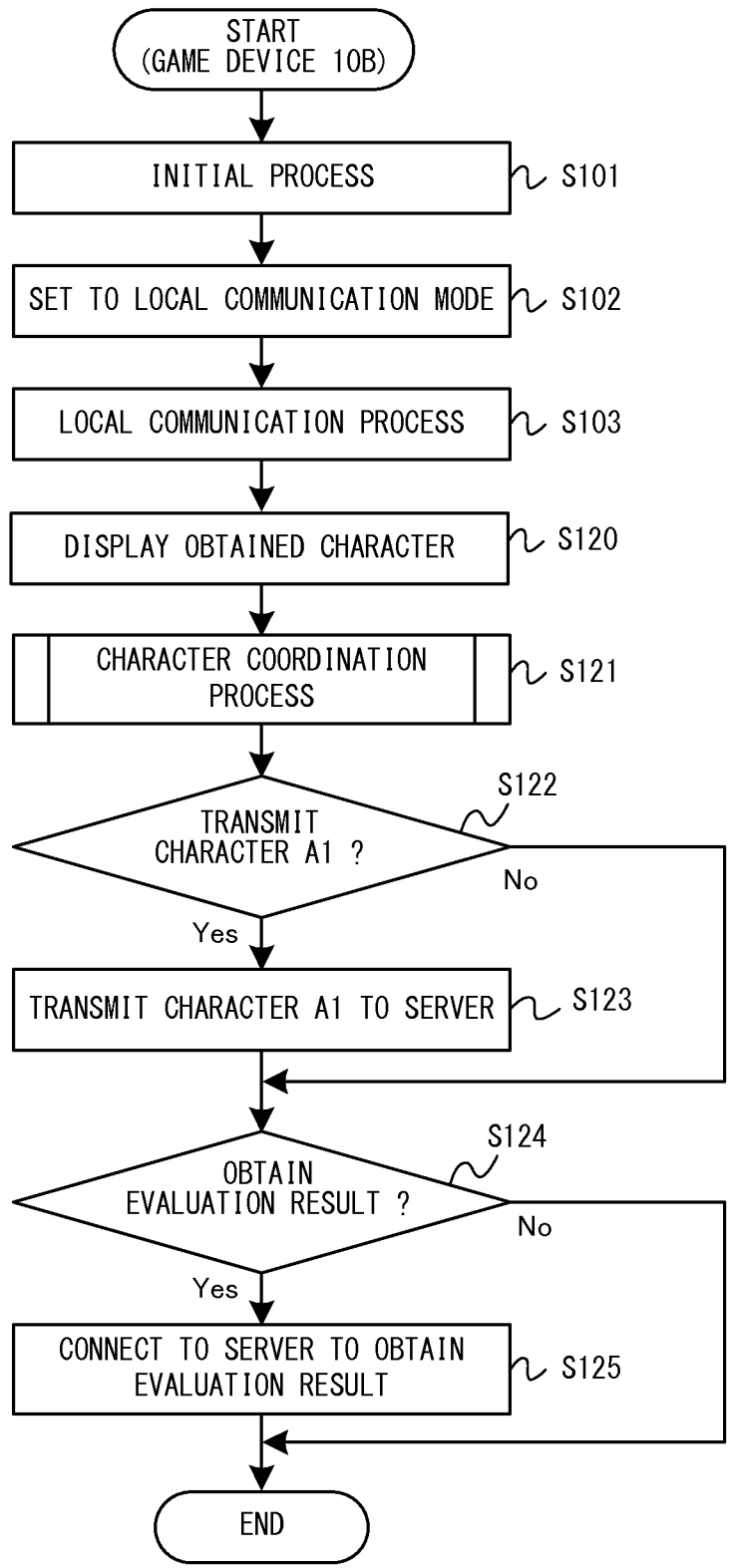
FIG. 28 is a main flowchart showing an example non-limiting flow of a process executed by the game device 10B of the third example embodiment.

Next, the game process executed in the game devices 10A and 10B will be described in detail with reference to FIGS. 28 to 30. FIG. 28 is a main flowchart showing an example non-limiting flow of a process executed by the game device 10B of the third example embodiment. Note that, in FIG. 28, steps similar to those of FIG. 10 are indicated by the same reference characters and will not be described.

Initially, in step S101, the game device 10B executes an initial process. In the initial process, the game device 10B transmits to the server 50 an instruction to generate the shop B. In response to the instruction, the server 50 generates the shop B, and transmits to the game device 10B the shop-B-information for accessing the shop B. The shop-B-information is stored in storage means (the main memory 32, a non-volatile memory, or the like) of the game device 10B. Specifically, in the initial process, the game device 10B transmits to the server 50 the character B, information about the user B, and the like, which are in turn registered in the shop B. The shop B is customized by the user B's operation on his or her own.

Next, in step S102, the game device 10B is set to the local communication mode. Next, in the local communication process of step S103, the game device 10B obtains the character A and the shop-A-information from the game device 10A. The local communication process is ended based on the user's operation.

Next, when local communication is ended based on the user's operation and the game is resumed, in step S120 the game device 10B resumes the game and displays the obtained characters. For example, a list of the obtained characters and shop information related to the characters is displayed on the display unit 12. For example, when the user selects the obtained shop-A-information, the game device 10B accesses the shop A to obtain the shop-A-information. When the user B selects the character A from the obtained characters, an image for coordinating the character A's clothing is displayed.

Next, in step S121, the game device 10B executes a character coordination process. In the character coordination process, in step S103, the clothing of the character A received from the game device 10A is coordinated based on the user B's operation. The character coordination process will be described in detail hereinafter with reference to FIG. 29.

Figure 29:
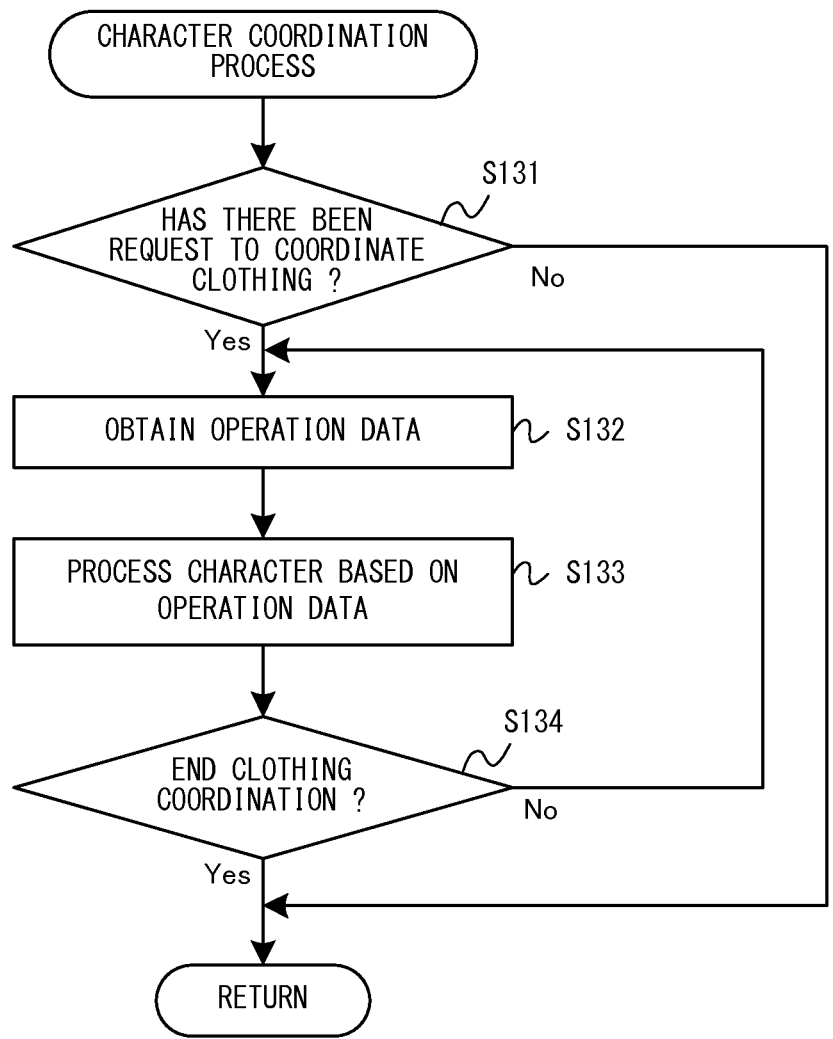
FIG. 29 is a flowchart showing an example non-limiting detailed flow of a character coordination process (step S121) of FIG. 28.
Figure 30:
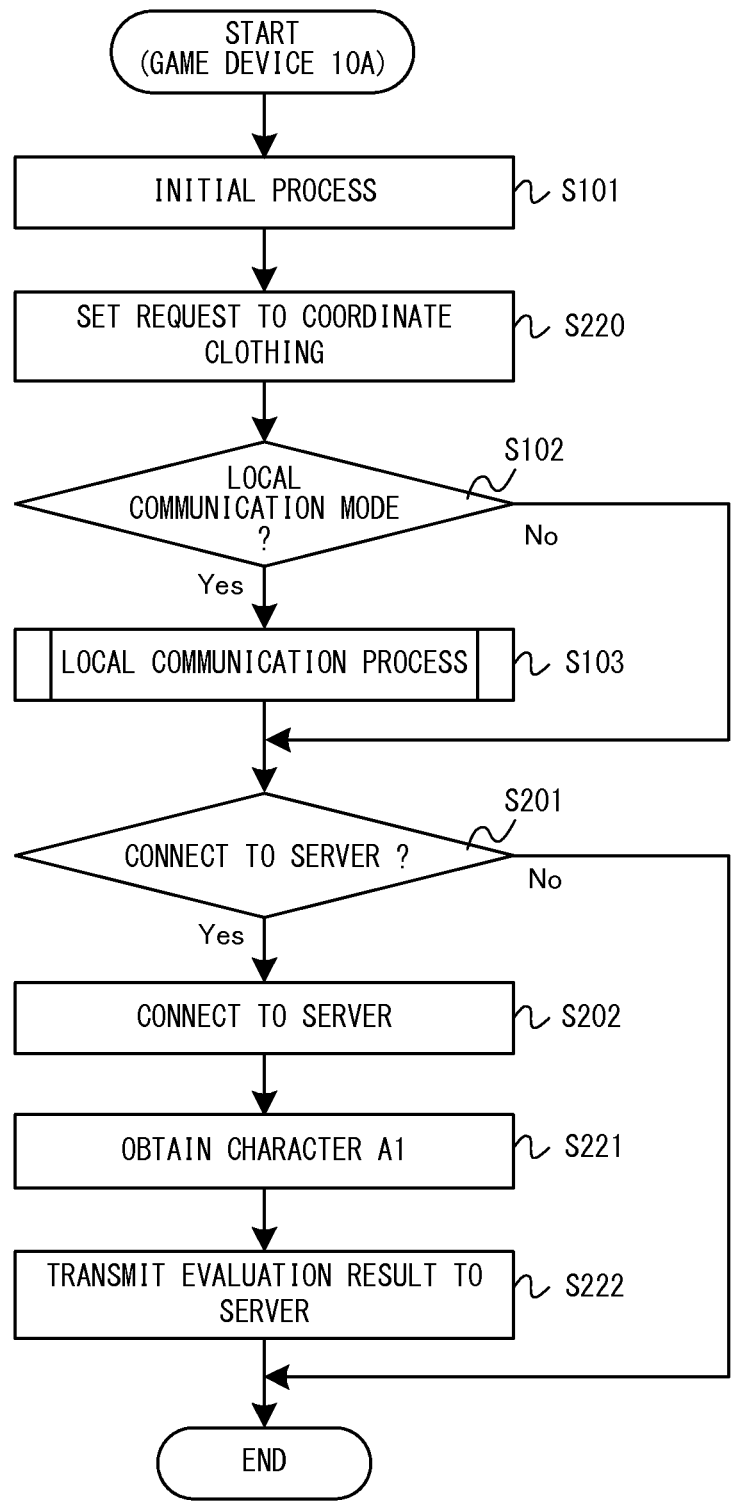
FIG. 30 is a flowchart showing an example non-limiting flow of a process executed by the game device 10A.

FIG. 29 is a flowchart showing an example non-limiting detailed flow of the character coordination process (step S121) of FIG. 28.

In step S131, the game device 10B determines whether or not the game device 10B has received a coordination request from another game device 10. Specifically, the game device 10B determines whether or not request data is included in data obtained from another game device 10, which is stored in the main memory 32. If the determination result is negative, then the game device 10B ends the character coordination process. On the other hand, if the determination result is positive, then the game device 10B executes step S132. It is assumed hereinafter that the obtained data 111 from the game device 10A includes request data.

In step S132, the game device 10B includes operation data. Specifically, the CPU 31 obtains from the operation unit 11 operation data corresponding to an operation performed on the operation unit 11 of the game device 10B. Next, the game device 10B executes step S133.

In step S133, the game device 10B coordinates the character A's clothing (or processes the character A) based on the operation data obtained in step S132. Specifically, when the user B selects a predetermined item stored in the game device 10B, the selected item is attached to the character A (see FIG. 24). The character A whose clothing has been coordinated is stored as the character-A1-data 114 to the main memory 32. The game device 10B also executes a display process. By performing the display process, an image containing the character A whose clothing has been coordinated is displayed on the screen of the display unit 12 of the game device 10B. Note that, as shown in FIG. 24, the image 68 indicating the details of a request set by the user A is displayed on the screen of the game device 10B. The user B coordinates the character A's clothing based on the details of the request indicated by the image 68. Next, the game device 10B executes step S134.

In step S134, the game device 10B determines whether or not to end coordination. For example, when the user B performs an operation for ending coordination of the character A's clothing (YES in step S134), the game device 10B ends the character coordination process. On the other hand, when the game device 10B determines not to end coordination of the character A's clothing, the game device 10B executes step S132 again.

Referring back to FIG. 28, next, in step S122, the game device 10B determines whether or not to transmit the character A (the character A1) whose clothing has been coordinated. Specifically, the game device 10B determines whether or not the character-A1-data 114 stored in the main memory 32 satisfies a predetermined criterion. For example, the game device 10B determines that the character-A1-data 114 does not satisfy the predetermined criterion when the character A1 does not wear an item which should be worn (e.g., a cloth is not attached). If the determination result is positive, then the game device 10B executes step S123. On the other hand, if the determination result is negative, then the game device 10B executes step S124. Note that, instead of the game device 10B, the server 50 may determine whether or not the character A1 satisfies the predetermined criterion.

In step S123, the game device 10B transmits the character A1 to the server 50. Specifically, the game device 10B accesses the server 50 based on the identification information A (shop-A-information) included in the obtained data 111 from the game device 10A. More specifically, the game device 10B transmits to the server 50 data including the shop-A-information (information about a transmission destination), the shop-B-information (information about a transmission source), and the character A1. The game device 10B accesses the shop A on the server 50 based on the shop-A-information to store the character A1 to the collection data box 65A in the shop A. Specifically, the server 50 stores the character A1 transmitted from the game device 10B in the collection data box 65A in the shop A. In this case, the server 50 stores the shop-B-information transmitted from the game device 10B, and the character A1, in association with each other. As a result, while the character A1 is stored in the collection data box 65A, it is recorded that the character A1 is data transmitted from the game device 10B. Note that when the server 50 determines whether or not the character A1 satisfies the predetermined criterion (step S122), the server 50 stores the character A1 to the collection data box 65A only if the determination result is positive. If the determination result is negative, then even when the server 50 receives the character A1, the server 50 does not store the character A1 to the collection data box 65A. Next, the game device 10B executes step S124.

In step S124, the game device 10B determines whether or not to obtain an evaluation result. Specifically, the game device 10B determines to obtain an evaluation result when the user B has performed a predetermined operation. If the determination result is positive, then the game device 10B executes step S125. On the other hand, if the determination result is negative, the game device 10B ends the main process of FIG. 28.

In step S125, the game device 10B accesses the server 50 to obtain the result of evaluation performed by the user A. The game device 10B obtains the user A's evaluation result stored in the shop B based on the shop-B-information which is stored in itself. Specifically, the game device 10B accesses the response data box 66B of the shop B to obtain the user A's evaluation result. Now the main process of FIG. 28 is ended.

Next, the game process executed by the game device 10A will be described in detail with reference to FIG. 30. FIG. 30 is a flowchart showing an example non-limiting flow of the process executed by the game device 10A. Note that, in FIG. 30, steps similar to those of FIG. 12 are indicated by the same reference characters and will not be described.

Initially, the game device 10A executes an initial process in step S101, and thereafter, executes step S220.

In step S220, the game device 10A sets a request for coordination. Specifically, when the image of FIG. 23 is displayed on the screen of the game device 10A, then if the user A selects the image 67 for setting a request for coordination, the game device 10A generates request data. Here, the generated request data includes the details of the request set by the user A. For example, when the image 67 is selected by the user A, a plurality of options indicating the details of the request may be displayed (see FIG. 23). For example, in each of the options, a string of letters etc. is written which indicates what kind of clothing coordination is desired for the character A. The details of the request are set by the user A selecting one of the options (e.g., a request indicating that "Coordinate clothing so that the character looks cute"). Alternatively, the user A may input details of any arbitrary request.

Next, the game device 10A executes steps S102 and S103. Note that, in the local communication process of step S103, the game device 10A transmits request data including the details of the request which have been set in step S220 and the character A, and the shop-A-information, to the game device 10B which is located within a predetermined range from the game device 10A.

After step S103, step S201 is executed. In step S201, the game device 10A determines whether or not to connect to the server 50. If the determination result is positive, the game device 10A connects to the server 50 (step S202). After step S202, step S221 is executed.

In step S221, the game device 10A obtains the character A1 from the server 50. Specifically, the game device 10A accesses the collection data box 65A in the shop A on the server 50 to obtain the character A1 (and other characters A whose clothing has been coordinated). The collection data box 65A stores the characters A whose clothing has been coordinated by other users. The game device 10A obtains from the collection data box 65A the characters A whose clothing has been coordinated, whereby the user A can view the characters A whose clothing has been coordinated by other users, on the screen of the game device 10A (FIG. 26). Note that the character A1 may be obtained based on the user A's operation. For example, a string of letters etc., an icon, or the like which indicates that the character A1 is stored may be displayed on the screen of the game device 10A. When the user A selects the string of letters etc., the icon, or the like, the game device 10A may transmit to the server 50 a request to obtain the character A1. The server 50 may transmit the character A1 to the game device 10A in response to the request to obtain the character A1. Thus, the game device 10A obtains (downloads) the character A1 from the server 50. Next, the game device 10A executes step S222.

In step S222, the game device 10A transmits the evaluation result to the server 50. For example, when the user A performs a predetermined operation (e.g., an operation of selecting the image 69b of FIG. 26) to evaluate the character A1, the game device 10A transmits to the server 50 a request to store the evaluation result. The request to store the evaluation result includes the evaluation result and the shop-B-information. Based on the shop-B-information, the game device 10A transmits the evaluation result to the response data box 66B of the shop B on the server 50. For example, in FIG. 26, a link to the shop B may be set in the image 69b displayed below the character A1, and when the image 69b is selected, the evaluation result may be transmitted to the shop B. Thus, the evaluation result is transmitted to the response data box 66B in the shop B, and the user B can access to the response data box 66B of his or her own shop B to refer to the evaluation result of the user A. Now the process of FIG. 30 is ended.

Note that the process executed by the server 50 of the third example embodiment is similar to the process executed by the server 50 of the first example embodiment, except for the kinds of stored data, and therefore, will not be described. Specifically, in the third example embodiment, characters whose clothing has been coordinated are stored in the collection data box 65, and evaluation results from users are stored in the response data box 66.

As described above, in the third example embodiment, for example, when the users A and B pass each other in a town, the game devices 10A and 10B perform local communication, so that the game device 10B obtains character data. If the game device 10A has set a coordination request, the game device 10B obtains the character A and the details of a request from the game device 10A. The user B coordinates the clothing of the character A (or processes the character A) obtained from the game device 10A using the game device 10B. Thereafter, the user B transmits the character A whose clothing has been coordinated, via the server 50, to the user A. The user B can also obtain an evaluation result from the user A via the server 50.

In the third example embodiment, one user transmits a character to another user who that user passes, and obtains the character whose clothing has been coordinated by the other user, whereby his or her own dress sense can be improved. If the user transmits a response to another user who has generated his or her favorite one of characters whose clothing has been coordinated, communication can be established between these users.

In the third example embodiment, the clothing of an obtained character is coordinated using items (material data) stored in each game device 10. Different users' game devices have different items, and therefore, each user can obtain characters whose clothing has been coordinated in various display forms.

Note that, in the third example embodiment, one user's character is transmitted to another user's game device 10, in which the other user in turn processes the character. In another example embodiment, any kind of data may be transmitted from one user's game device 10 to another user's game device 10. For example, data of an image or a string of letters etc. may be transmitted from one user's game device 10 to another user's game device 10, in which the data may be in turn processed.

In the above example embodiment, the game device 10 specifies the data storage destination (the collection data box 65 or the response data box 66) on the server 50. In another example embodiment, the server 50 may specifies the storage destination. For example, the game device 10B transmits to the server 50 the character A1 and identification information (shop-A-information) related to the game device 10A. The server 50 may store the received character A1 to the collection data box 65A of the shop A corresponding to the game device 10A based on the received identification information. For example, the game device 10A transmits to the server 50 an evaluation result and identification information related to the game device 10B. The server 50 may store the received evaluation result to the response data box 66B of the shop B corresponding to the game device 10B based on the received identification information.

In the above example embodiment, one game device 10 exchanges identification information (information for accessing a web page on a server, e.g., shop information) with another game device 10 located within a predetermined range from that game device 10 via local communication (short-distance communication). In another example embodiment, data may be exchanged using other techniques instead of short-distance communication. For example, each game device may receive radio waves from a base station, and transmit and receive data via the base station, like mobile telephones and the like. For example, each game device may regularly transmit its own identification information to the base station, and the base station may wirelessly transmit the received identification information. Each game device may obtain identification information of other devices transmitted from the base station. As a result, the game devices can exchange identification information via the base station. Each game device may obtain information about its own location using the GPS, or may obtain (calculate) information about its own location based on ID information of the base station or the strength of radio waves from the base station. Each game device may transmit to the base station its own identification information and its own location information obtained using the GPS or the like. One game device may obtain the identification information and the location information of another device which are transmitted from the base station. One game device can determine whether or not another device is located within a predetermined range from itself, based on its own location information and the other device's location information obtained from the base station.

Alternatively, for example, each game device may obtain its own location information using the GPS, and transmit the location information and identification information possessed by itself wirelessly to a location management server. For example, the location management server may store the game device 10A's location information and the game device 10B's location information. In this case, for example, the game device 10A may connect to the server, and transmit a request to obtain identification information of another game device which is located within a predetermined range from itself. The location management server may calculate a distance between the game devices 10A and 10B based on the game device 10A's location information and the game device 10B's location information, and if the calculated distance is a predetermined value or less, may transmit the game device 10B's identification information to the game device 10A. Thus, the game devices may exchange identification information.

The game device 10 may execute the above process by executing other applications instead of the above game.

In the above example embodiments, the above process is assumed to be executed by the portable game device 10. In another example embodiment, the above process may be executed by other portable information processing devices (a mobile telephone, a smartphone, a PDA, a personal computer, a tablet computer, and the like) in addition to the game-dedicated device. In another example embodiment, the above process may be executed in, for example, a stationary game device or an information processing device instead of a portable device.

In another example embodiment, the portable game device 10 may be configured as a terminal system including a plurality of sub-devices, and the process executed by the game device 10 may be executed by the sub-devices in a distributed manner. The above process may be executed in an information processing system including the terminal system and the server 50. The server 50 may be configured as a distributed network system, such as a so-called cloud computing system.

In the above example embodiments, the above process of the flowchart is executed by the CPU 31 of the game device 10 executing the above program. In another example embodiment, a portion of or the entire process may be executed by a dedicated circuit included in the game device 10 or other general-purpose processors. At least one processor may operate as a "programmed logic circuit" for executing the above process.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a plurality of information processing devices having a wireless communication function, and a server, wherein
   one of the information processing devices includes a computer configured to perform at least
      obtaining, via wireless communication, first identification information possessed by an unspecified other one of the information processing devices located within a predetermined range from the one of the information processing devices, and
      transmitting transmission data stored or generated by the one of the information processing devices to the server on a network using the first identification information,
   the server includes a computer configured to perform at least
      accumulating the transmitted transmission data, and the server further includes
      a server transmitter configured to transmit the accumulated transmission data to the unspecified other one of the information processing devices in response to access performed by the unspecified other one of the information processing devices, and
   the unspecified other one of the information processing devices includes a computer configured to perform at least
      accessing the server using the first identification information to obtain the transmission data accumulated in the server, wherein
   the server has information related to the unspecified other one of the information processing devices, where the information is published for at least the one of the information processing devices which has obtained the first identification information, and the unspecified other one of the information processing devices, and
   the one of the information processing devices which has obtained the first identification information is allowed to browse the information related to the unspecified other one of the information processing devices using the first identification information, wherein
   the server has an information publishing area corresponding to the unspecified other one of the information processing devices,
   the information publishing area corresponding to the unspecified other one of the information processing devices contains the information related to the unspecified other one of the information processing devices, and wherein
   the computer of the server accumulates the transmission data in the information publishing area corresponding to the unspecified other one of the information processing devices.

2. The information processing system of claim 1, wherein the information related to the unspecified other one of the information processing devices is published for a third one of the information processing devices which has not obtained the first identification information, and the third one of the information processing devices is allowed to browse the information related to the unspecified other one of the information processing devices by accessing the server.

3. The information processing system of claim 1, wherein the information related to the unspecified other one of the information processing devices includes information transmitted from the unspecified other one of the information processing devices.

4. The information processing system of claim 1, wherein the information related to the unspecified other one of the information processing devices includes information generated by a user of the unspecified other one of the information processing devices.

5. The information processing system of claim 1, wherein the information publishing area corresponding to the unspecified other one of the information processing devices includes a private portion on which a predetermined access limitation is provided, and
the computer of the server accumulates the transmission data in the private portion of the information publishing area corresponding to the unspecified other one of the information processing devices.

6. The information processing system of claim of claim 1, wherein
the unspecified other one of the information processing devices includes a transmitter configured to transmit, to the server, response data indicating a response to the obtained transmission data,
the computer of the server is further configured to accumulate the response data, and the computer of the one of the information processing devices is further configured to obtain the response data accumulated in the server.

7. The information processing system of claim 6, wherein the server has an information publishing area corresponding to the one of the information processing devices and containing information related to the one of the information processing devices, and the unspecified other one of the information processing devices is allowed to access the information publishing area corresponding to the one of the information processing devices using second identification information possessed by the one of the information processing devices, and browse the information related to the one of the information processing devices.

8. The information processing system of claim 7, wherein the computer of the server accumulates the response data in the information publishing area corresponding to the one of the information processing devices, and the computer of the one of the information processing devices obtains the response data accumulated in the information publishing area corresponding to the one of the information processing devices.

9. The information processing system of claim 1, wherein the computer of one of the information processing devices obtains the first identification information and character data possessed by the unspecified other one of the information processing devices, and it transmits to the server the transmission data generated using the character data.

10. The information processing system of claim 1, wherein the computer of the unspecified other one of the information processing devices is further configured
to generate details of a request based on a user's input, and the computer of the one of the information processing devices is further
configured to obtain via wireless communication the details of the request generated in the unspecified other one of the information processing devices, and
generate transmission data corresponding to the details of the request based on a user's input.

11. The information processing system of claim 1, wherein the computer of the one of the information processing devices is further
a configured to obtain, via wireless communication, predetermined data possessed by the unspecified other one of the information processing devices, and
process the predetermined data based on a user's operation, and
transmit to the server the processed data as the transmission data.

12. The information processing system of claim 1, wherein the one of the information processing devices obtains the first identification information, and transmits second identification information possessed by the one of the information processing devices, via wireless communication, and the unspecified other one of the information processing devices transmits the first identification information, and obtains the second identification information, via wireless communication.

13. The information processing system of claim 1, wherein the computer of the one of the information processing devices obtains the first identification information via short-distance wireless communication.

14. An information processing device having a wireless communication function comprising a computer configured to perform at least:
obtaining, via wireless communication, first identification information possessed by an unspecified other information processing device located within a predetermined range from the information processing device;
transmitting, via wireless communication, second identification information possessed by the information processing device to the unspecified other information processing device located within the predetermined range from the information processing device;
transmitting data stored or generated by the information processing device to a server on a network using the obtained first identification information; and
accessing the server to obtain, from the server, data which the unspecified other information processing device has transmitted to the server using the second identification information, wherein
the server accumulates the data transmitted from the information processing device, and transmits the accumulated data to the unspecified other information processing device in response to access from the unspecified other information processing device, wherein
the server has information related to the unspecified other information processing device, where the information is published for at least the information processing device which has obtained the first identification information, and unspecified other information processing device, and
the information processing device which has obtained the first identification information is allowed to browse the information related to the unspecified other information processing device using the first identification information, wherein
the server has an information publishing area corresponding to the unspecified other information processing device,
the information publishing area corresponding to the unspecified other information processing device contains the information related to the unspecified other information processing devices, and wherein
the computer of the server accumulates the transmission data in the information publishing area corresponding to the unspecified other information processing device.

15. A non-transitory computer readable storage medium storing an information processing program executed by a computer of an information processing device having a wireless communication function, the information processing program causing the computer to execute:
obtaining, via wireless communication, first identification information possessed by an unspecified other information processing device located within a predetermined range from the information processing device;
transmitting, via wireless communication, second identification information possessed by the information processing device to the unspecified other information processing device located within the predetermined range from the information processing device;
transmitting data stored or generated by the information processing device to a server on a network using the obtained first identification information; and
accessing the server to obtain, from the server, data which the unspecified other information processing device has transmitted to the server using the second identification information, wherein the server accumulates the data transmitted from the information processing device, and transmits the accumulated data to the unspecified other information processing device in response to access from the unspecified other information processing device, wherein the server has information related to the unspecified other information processing device, where the information is published for at least the information processing device which has obtained the first identification information, and unspecified other information processing device, and the information processing device which has obtained the first identification information is allowed to browse the information related to the unspecified other information processing device using the first identification information, wherein the server has an information publishing area corresponding to the unspecified other information processing device, the information publishing area corresponding to the unspecified other information processing device contains the information related to the unspecified other information processing device, and wherein the computer of the server accumulates the transmission data in the information publishing area corresponding to the unspecified other information processing device.

16. An information processing method executed in an information processing system including a plurality of information processing devices having a wireless communication function, and a server, wherein one of the information processing devices executes obtaining, via wireless communication, first identification information possessed by an unspecified other one of the information processing devices located within a predetermined range from the one of the information processing devices, and transmitting transmission data stored or generated by the one of the information processing devices to the server on a network using the first identification information, the server executes accumulating the transmission data transmitted in the transmitting transmission data stored or generated by the one of the information processing devices, and transmitting the transmission data accumulated in the accumulating to the unspecified other one of the information processing devices in response to access performed by the unspecified other one of the information processing devices, and the unspecified other one of the information processing devices executes accessing the server using the first identification information to obtain the transmission data accumulated in the server, wherein the server has information related to the unspecified other one of the information processing devices, where the information is published for at least the one of the information processing devices which has obtained the first identification information, and the unspecified other one of the information processing devices, and the one of the information processing devices which has obtained the first identification information is allowed to browse the information related to the unspecified other one of the information processing devices using the first identification information, wherein the server has an information publishing area corresponding to the unspecified other one of the information processing devices, the information publishing area corresponding to the unspecified other one of the information processing devices contains the information related to the unspecified other one of the information processing devices, and wherein the computer of the server accumulates the transmission data in the information publishing area corresponding to the unspecified other one of the information processing devices.

* * * * *